US009557625B2

(12) United States Patent
Coddington et al.

(10) Patent No.: US 9,557,625 B2
(45) Date of Patent: Jan. 31, 2017

(54) FIBER FREQUENCY COMB ARTICLE

(71) Applicant: NATIONAL INSTITUTE OF STANDARDS AND TECHNOLOGY, Gaithersburg, MD (US)

(72) Inventors: Ian Coddington, Boulder, CO (US); Laura Sinclair, Boulder, CO (US); Nathan R. Newbury, Boulder, CO (US); Lindsay Sonderhouse, Boulder, CO (US); William C Swann, Boulder, CO (US)

(73) Assignees: THE UNITED STATES OF AMERICA, AS REPRESENTED BY THE SECRETARY OF COMMERCE, Washington, DC (US); THE REGENTS OF THE UNIVERISTY OF COLORADO, Denver, CO (US)

( * ) Notice: Subject to any disclaimer, the term of this patent is extended or adjusted under 35 U.S.C. 154(b) by 0 days.

(21) Appl. No.: 14/710,660

(22) Filed: May 13, 2015

(65) Prior Publication Data
US 2015/0253645 A1    Sep. 10, 2015

Related U.S. Application Data

(60) Provisional application No. 62/000,640, filed on May 20, 2014.

(51) Int. Cl.
G02F 1/35      (2006.01)
H01S 3/067    (2006.01)
H01S 3/00     (2006.01)
G02F 1/365    (2006.01)
H01S 3/11     (2006.01)
G02F 1/377    (2006.01)

(52) U.S. Cl.
CPC .......... *G02F 1/3532* (2013.01); *H01S 3/0057* (2013.01); *H01S 3/0092* (2013.01); *H01S 3/06712* (2013.01); *H01S 3/06754* (2013.01); *G02F 1/365* (2013.01); *G02F 1/3775* (2013.01); *G02F 2001/3528* (2013.01); *G02F 2203/56* (2013.01); *H01S 3/1118* (2013.01)

(58) Field of Classification Search
CPC ...... G02F 1/3532; G02F 1/365; G02F 1/3775; G02F 2203/56; H01S 3/06754; H01S 3/118

See application file for complete search history.

(56) References Cited

U.S. PATENT DOCUMENTS 6,072,811 A    6/2000 Fermann et al.
6,775,447 B2   8/2004 Nicholson et al.
(Continued)

OTHER PUBLICATIONS

I. Hartl et al., "Integrated self-referenced frequency-comb laser based on a combination of fiber and waveguide technology", Optics Express, vol. 13 No. 17, Aug. 22, 2005, pp. 6490-6496.*
(Continued)

*Primary Examiner* — Daniel Petkovsek
(74) *Attorney, Agent, or Firm* — Toby D. Hain

(57) ABSTRACT

The present invention relates to a frequency comb article includes an oscillator; a fiber amplifier; a frequency doubler; a nonlinear fiber; and an interferometer, wherein the fiber amplifier and the nonlinear fiber include a polarization maintaining fiber, and the oscillator, frequency doubler, and interferometer are entirely polarization maintaining.

20 Claims, 17 Drawing Sheets

(56) References Cited

U.S. PATENT DOCUMENTS

| | | | |
|---|---|---|---|
| 6,785,303 | B1 | 8/2004 | Holzwarth et al. |
| 6,850,543 | B2 | 2/2005 | Cundiff et al. |
| 7,418,017 | B2 | 8/2008 | Holzwarth et al. |
| 7,733,922 | B1 * | 6/2010 | Munroe ............... H01S 3/2316 372/102 |
| 7,787,730 | B2 | 8/2010 | Hirano et al. |
| 7,940,816 | B2 | 5/2011 | Nicholson |
| 8,135,048 | B2 | 3/2012 | Fermann et al. |
| 8,548,014 | B2 | 10/2013 | Fermann et al. |
| 8,570,646 | B2 | 10/2013 | Fermann |
| 8,792,525 | B2 | 7/2014 | Fermann et al. |
| 9,252,554 | B2 | 2/2016 | Fermann |
| 9,276,372 | B2 | 3/2016 | Haensel et al. |

OTHER PUBLICATIONS

Hyunil Byun et al., Compact, stable 1 GHz femtosecond Er-droped fiber lasers, Applied Optics, Oct. 10, 2010, 5577-5582, vol. 49 No. 29.

Esther Baumann et al., High-performance, vibration-immune, fiber-laser frequency comb, Optics Letters, Mar. 1, 2009, 638-640, vol. 34 No. 5.

T. R. Schibli et al., Frequency metrology with a turnkey all-fiber system, Optics Letters, Nov. 1, 2004, 2467-2469, vol. 29, No. 21.

* cited by examiner

FIBER FREQUENCY COMB ARTICLE

CROSS REFERENCE TO RELATED APPLICATIONS

This application claims the benefit of U.S. Provisional Patent Application Ser. No. 62/000,640 filed May 20, 2014, the disclosure of which is incorporated herein by reference in its entirety.

STATEMENT REGARDING FEDERALLY SPONSORED RESEARCH

This invention was made with United States government support from the National Institute of Standards and Technology. The government has certain rights in the invention.

BRIEF DESCRIPTION

Disclosed is a frequency comb article comprising: an oscillator to produce an oscillator frequency comb comprising: a first power; and a first optical bandwidth; a fiber amplifier to receive the oscillator frequency comb from the oscillator and to produce an amplifier frequency comb based on the oscillator frequency comb, the amplifier frequency comb comprising: a second power that is greater than the first power; and a second optical bandwidth that is greater than the first optical bandwidth; a nonlinear fiber to receive the amplifier frequency comb from the fiber amplifier and to produce a spectrally broadened frequency comb based on the amplifier frequency comb, the spectrally broadened frequency comb comprising a third optical bandwidth that is greater than the second optical bandwidth; a frequency doubler to receive the spectrally broadened frequency comb from the nonlinear fiber and to provide a doubled frequency comb comprising: a plurality of fundamental frequencies from the spectrally broadened frequency comb; and a plurality of doubled frequencies, based on the plurality of fundamental frequencies; and an interferometer to receive the doubled frequency comb from frequency doubler and to provide a signal frequency comb based on the doubled frequency comb, the signal frequency comb comprising the plurality of doubled frequencies that is temporally overlapped and spatially overlapped with the plurality of fundamental frequencies, the fiber amplifier and the nonlinear fiber comprise a polarization maintaining fiber, and the oscillator, frequency doubler, and interferometer are entirely polarization maintaining.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments is presented herein by way of exemplification and not limitation.

It has been discovered that a frequency comb article described herein provides an all-fiber configuration that advantageously maintains optical alignment and polarization of light therethrough in a static or dynamic environment, e.g., when subjected to vibration or acceleration. The frequency comb article can be assembled relatively quickly and can include commercially available telecommunications grade micro-optic components. The frequency comb article overcomes birefringence in optical fiber components that ordinarily occur due to strain, temperature change, humidity change, and the like. Hence, the frequency comb article is configured to provide an optical frequency comb that does not exhibit polarization wandering within its fiber. Accordingly, the frequency comb article can be mode-locked and produces stable optical frequency combs that do not spectrally drift. Beneficially, the frequency comb article includes polarization-maintaining (PM) fiber and PM fiber-optic members.

Figure 1:
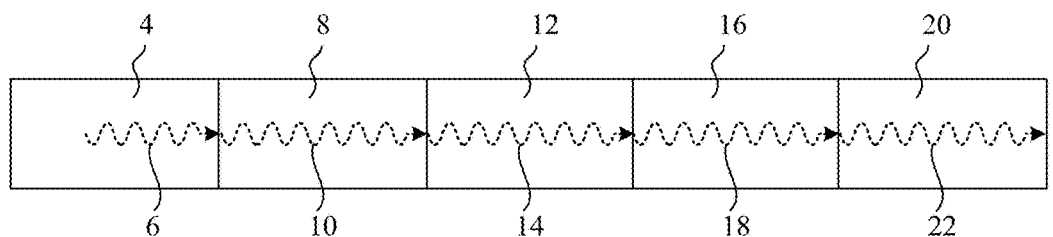
FIG. 1 shows an embodiment of a frequency comb article.

In an embodiment, as shown in FIG. 1, frequency comb article 2 includes oscillator 4 in optical communication with fiber amplifier 8. Oscillator 4 is configured to produce oscillator frequency comb 6 that includes a first power and a first optical bandwidth. Fiber amplifier 8 is configured to receive oscillator frequency comb 6 from oscillator 4 and to produce amplifier frequency comb 10, which is based on oscillator frequency comb 6. Amplifier frequency comb 10 includes a second power that is greater than the first power and a second optical bandwidth that is greater than the first optical bandwidth. Nonlinear fiber 12 is in optical communication with fiber amplifier 8 and configured to receive amplifier frequency comb 10 from fiber amplifier 8 and is further configured to produce spectrally broadened frequency comb 14, which is based on the amplifier frequency comb. Spectrally broadened frequency comb 14 includes a third optical bandwidth that is greater than the second optical bandwidth. Nonlinear fiber 12 is in optical communication with frequency doubler 16 that is configured to receive spectrally broadened frequency comb 14 from nonlinear fiber 12 and is also configured to provide doubled frequency comb 18. Doubled frequency comb 18 includes a plurality of fundamental frequencies from spectrally broadened frequency comb 14 and a plurality of doubled frequencies, which is based on the plurality of fundamental frequencies. Frequency comb article 2 also includes interferometer 20 that is in optical communication with frequency doubler 16. Interferometer 20 is configured to receive doubled frequency comb 18 from frequency doubler 16 and also is configured to provide signal frequency comb 22, which is based on doubled frequency comb 18. Signal frequency comb 22 includes the plurality of doubled frequencies and the plurality of fundamental frequencies temporarily and spatially arranged such that the plurality of doubled frequencies are temporally overlapped and spatially overlapped with the plurality of fundamental frequencies. Additionally, fiber amplifier 8 and nonlinear fiber 12 include a polarization maintaining fiber, and oscillator 4, frequency doubler 16, and interferometer 20 are entirely polarization maintaining. Accordingly, frequency comb article 2 is configured to produce various frequency combs, e.g., oscillator frequency comb 6, amplifier frequency comb 10, spectrally broaden frequency comb 14, doubled frequency comb 18, and signal frequency comb 22.

Figure 2:
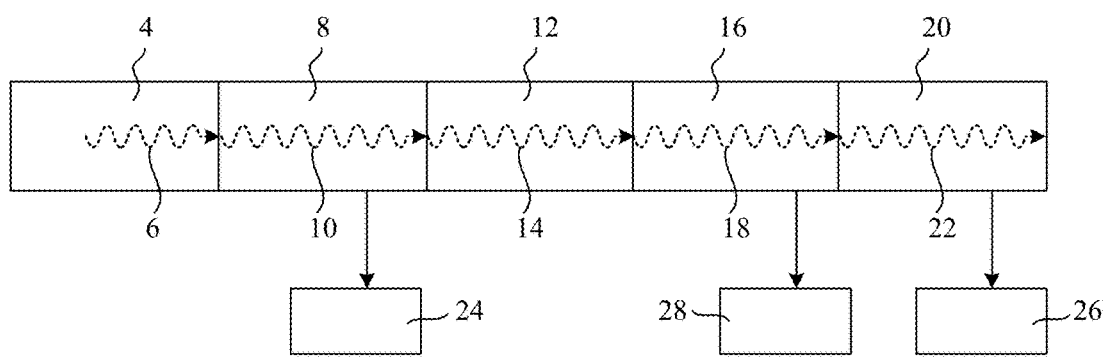
FIG. 2 shows an embodiment of a frequency comb article.

According to an embodiment, as shown in FIG. 2, frequency comb article 2 includes first controller 24 in optical communication with fiber amplifier 8. First controller 24 is configured to receive amplifier frequency comb 10 from fiber amplifier 8. Frequency comb article 2 also includes second controller 26 in optical communication with interferometer 20 and is configured to receive a signal frequency comb 22 from interferometer 20. Receiver 28 is in optical communication with frequency doubler 16 to receive doubled frequency comb 18 therefrom. In an embodiment, first controller 24 is in electrical communication with oscillator 4. In a certain embodiment, second controller 26 is in electrical communication with oscillator 4. In some embodiments, receiver 28 is configured to communicate doubled frequency comb 18 to a recipient, e.g., an instrument, optic, facility, optical clock, detector, and the like.

Figure 3:
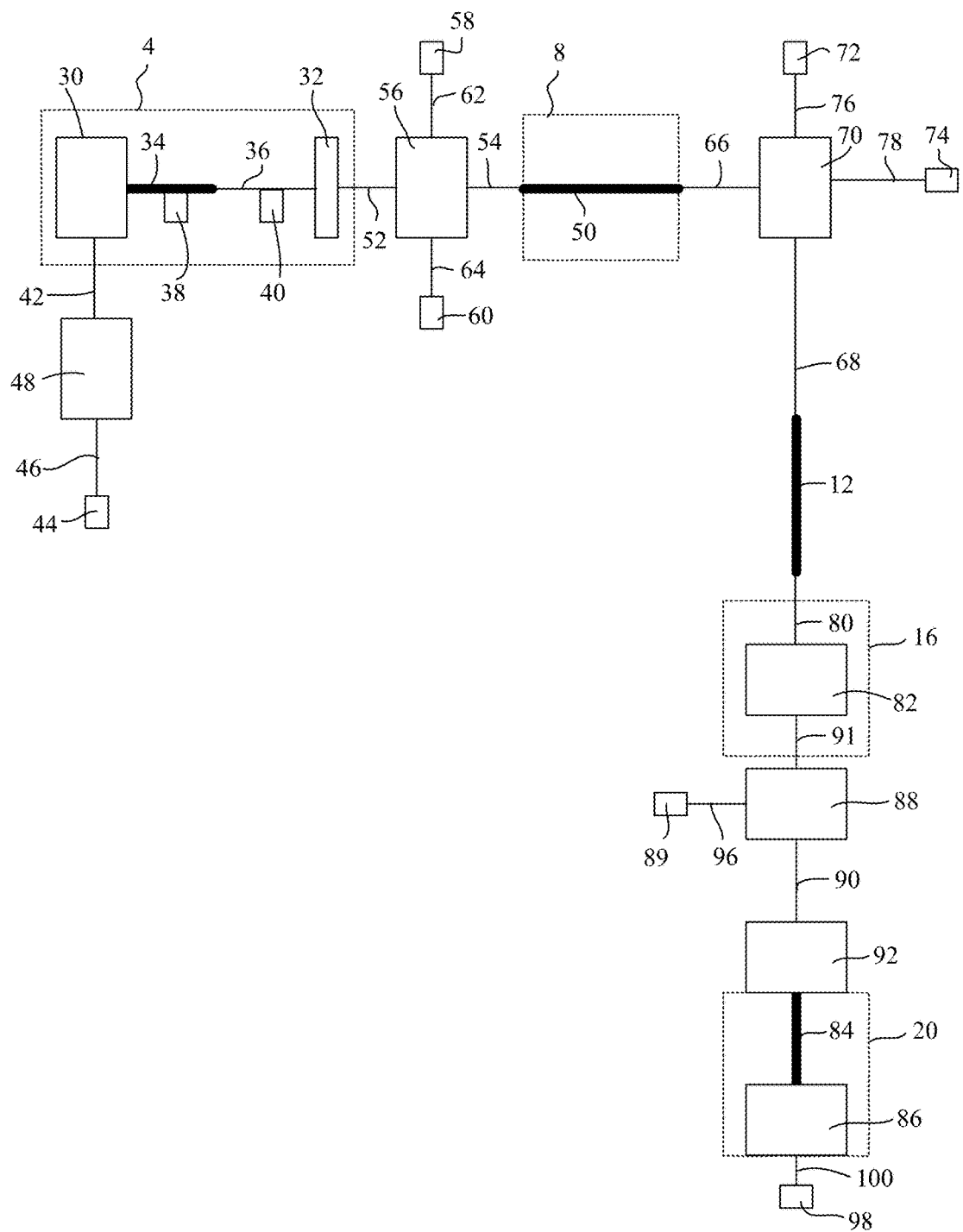
FIG. 3 shows an embodiment of a frequency comb article.

In an embodiment, as shown in FIG. 3, frequency comb article 2 includes oscillator 4 that includes first optical member 30 in optical communication with second optical member 32, wherein first oscillator fiber 34 and second oscillator fiber 36 are interposed between first optical member 30 and second optical member 32 that form a cavity to produce oscillator frequency comb 6. Oscillator 4 is configured to receive optical pump radiation from a radiation source (e.g., an external laser such as a diode laser and the like) that is in optical communication with oscillator 4 via connector 44. The optical pump radiation propagates through fiber 46, isolator 48, and fiber 42. Oscillator 4 also includes first mechanical transducer 38 and second mechanical transducer 40 that control optical characteristics of oscillator 4 and are disposed on first oscillator fiber 34 and second oscillator fiber 36. It is contemplated that mechanical transducers (38, 40), interact with first oscillator fiber 34 and second oscillator fiber 36 to stabilize oscillator frequency comb 6 by controlling a degree of freedom of oscillator frequency comb 6, e.g., a translation in a frequency domain of a plurality of teeth in oscillator frequency comb 6 or a frequency spacing between the plurality of teeth in oscillator frequency comb 6.

Frequency comb article 2 further includes fiber amplifier 8 that includes amplifier fiber 50 and which is in optical communication with second optical member 32 of oscillator 4 via fiber 52 and fiber 54 having isolator 56 disposed therebetween. Isolator 56 can be, e.g., a wavelength division multiplexer and also can be a tap, wherein isolator 56 include connector 58 and connector 60 in optical communication with isolator 56 via fiber 62 and fiber 64.

Fiber amplifier 8 is in optical communication with nonlinear fiber 12 via fiber 66 and fiber 68 having wavelength division multiplexer 70 disposed therebetween. Wavelength division multiplexer 70 also can be a tap and include connector 72 and connector 74 in optical communication with wavelength division multiplexer 70 via fiber 76 and fiber 78.

Nonlinear fiber 12 is in optical communication with frequency doubler 16 via fiber 80. Frequency doubler 16 can include a nonlinear optic 82 to double spectrally broadened frequency comb 14 from nonlinear fiber 12. Nonlinear optic 82 is in optical communication with interferometer 20 that includes interferometer fiber 84 optically connected to polarizing beam splitter 86. Interferometer fiber 84 is configured to receive doubled frequency comb 18 from nonlinear optic 82 of frequency doubler 16 via wavelength division multiplexer 88, fiber 90, fiber 91, and band pass filter 92. Wavelength division multiplexer 88 also can be a tap and include connector 94 in optical communication with wavelength division multiplexer 88 via fiber 96. Light, e.g., signal frequency comb 22, from polarizing beam splitter 86 of interferometer 20 can be communicated to connector 98 via fiber 100. In this manner, light in frequency comb article 2 propagates from oscillator 4 to interferometer 20 through fiber and solid optical components such that light does not obligate through free space along an optical path from isolator 4 to interferometer 20.

In this arrangement, oscillator frequency comb 6 propagates from first optical member 30 to amplifier fiber 50 through first oscillator fiber 34, second oscillator fiber 36, fiber 52, and fiber 54; amplifier frequency comb 10 propagates from amplifier fiber 50 to nonlinear fiber 12 through fiber 66 and fiber 68; spectrally broadened frequency comb 14 propagates from nonlinear fiber 12 to nonlinear optic 82 through fiber 80, doubled frequency comb 18 propagates from nonlinear optic 82 to interferometer fiber 84 through fiber 68 and fiber 91; and signal frequency comb 22 propagates from polarizing beam splitter 86 of interferometer 22 connector 98 via fiber 100.

Figure 4:
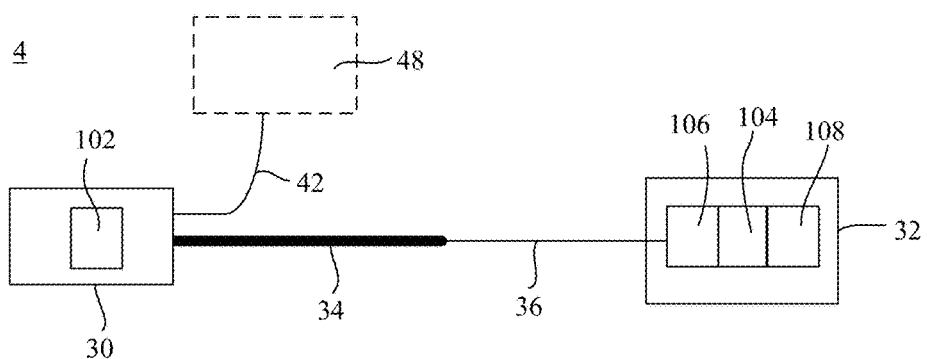
FIG. 4 shows an embodiment of an oscillator.
Figure 5:
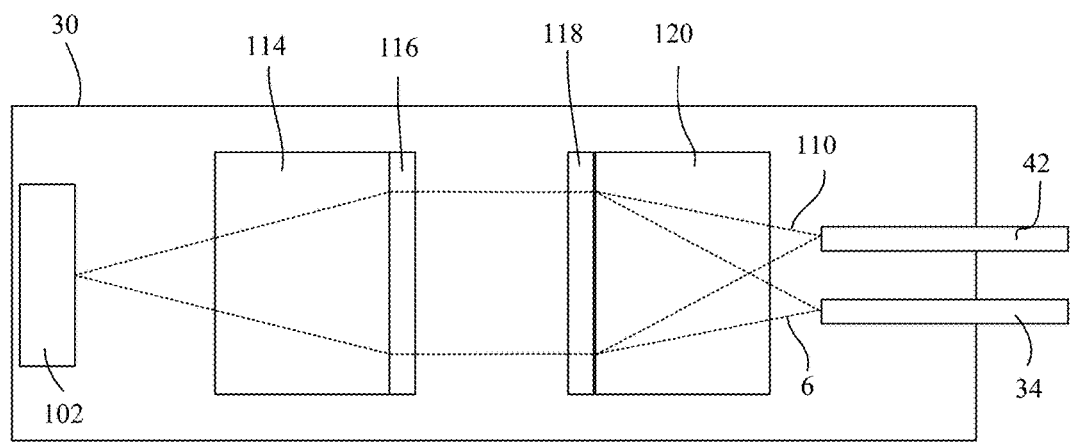
FIG. 5 shows an embodiment of a first optical member.

In an embodiment, as shown in FIG. 4, oscillator 4 includes first optical member 30 in optical communication with second optical member 32. First optical member 30 includes first mirror 102 to receive pump radiation 110 via fiber 42 and communicate oscillator frequency comb 6 through first oscillator fiber 34 second oscillator fiber 36 interposed between first mirror 102 and second mirror 104 of a second optical member 32. Second optical member 32 can also include connector 106 and connector 108. With reference to FIG. 5, in a particular embodiment, first optical member 30 includes first mirror 102 to receive pump radiation from fiber 42 and to reflect light for oscillator frequency comb 6 that is received by first oscillator fiber 34. Light propagating between first mirror 102 and fibers (42, 34) passes through a pair of lenses (114, 120) and optics (116, 118). Lens 114 and lens 120 can be a graded-index (GRIN, also referred to as gradient index) lens, and optic 116 and optic 118 respectively can be a polarizer and a dichroic filter.

According to an embodiment, oscillator 4 is a polarization maintaining fiber laser cavity and is configured to include positive feedback and to generate an uninterrupted, optically coherent, low timing jitter plurality of pulses that propagates through frequency comb article 2. In oscillator 4, first oscillator fiber 34 can be a polarization maintaining erbium-doped fiber. A dispersion of first oscillator fiber 34 can be anomalous dispersion. First oscillator fiber 34 is optically coupled to first mirror 102, which can be a semiconductor saturable absorber mirror (SESAM) that is configured to provide self-starting mode-locked operation of frequency comb article 2.

In an embodiment, a spot size of pump radiation 110 incident on first mirror 102 is selectively tuned to achieve a fluence, e.g., twice a saturation of SESAM, and to optimize a spectral bandwidth or pulse duration of oscillator frequency comb 6. Lens 114 and lens 120 focus or change a beam diameter of pump radiation 110 on first mirror 102 or oscillator frequency comb 6 onto first oscillator fiber 34. Polarizer 116 can be aligned with a slow axis of fiber 42 or first oscillator fiber 34 to provide a polarization of oscillator frequency comb 6. Second mirror 104 can be a dichroic mirror to receive or to communicate pump radiation 110 or oscillator frequency comb 6 to inject light into first oscillator fiber 34. Second optical member 32 includes second mirror 104 that can be formed by disposing a dielectric coating on a surface of connector 106 or connector 108. A reflectivity of the dielectric coating can be, e.g., 80%.

First oscillator fiber 34 or second oscillator fiber 36 can include an anomalous dispersion fiber to provide a selected net round-trip dispersion and to provide solutions mode-locking. Additionally, first oscillator fiber 34 or second oscillator fiber 36 can be selected to provide a substantially similar dispersion at a frequency of oscillator frequency comb 6. Here, oscillator 4 is configured to be self-mode locked, and oscillator 4 also is configured to be mode locked to amplifier frequency comb 10 from fiber amplifier 8 via first mechanical transducer 38 or second mechanical transducer 40. First mechanical transducer 38 or second mechanical transducer 40 can be a piezo-electric transducer disposed on first oscillator fiber 34 or second oscillator fiber 36. In a certain embodiment, oscillator 4 is referenced to signal frequency comb 22 from interferometer 20.

Additionally, oscillator 4 includes isolator 56 with connector 60 provide an optical tap to monitor oscillator frequency comb 6 and to provide oscillator frequency comb 6 for production of repetition rate frequency $f_{rep}$ of oscillator 4, e.g., by a photo detector.

Oscillator frequency comb 6 produced in oscillator 4 is provided to fiber amplifier 8 for power and optical-bandwidth generation of amplifier frequency comb 10. Amplifier fiber 50 can be a normal dispersion fiber that includes an erbium do pant. Fiber amplifier 8 is configured to be forward pumped and backward pumped via communication of pump light from an external pump source respectively at connector 58 and connector 72. A length of amplifier fiber 50 can be selected to provide a selected spectral width (or power) of amplifier frequency comb 10. Connector 70 provides, e.g., a 20% tap to provide output of amplifier frequency comb 10 to a recipient, e.g., an instrument, beam line, and the like. Amplifier frequency comb 10 can be compressed in fiber 66 or fiber 68 to be provided to nonlinear fiber 12. In one embodiment, fiber amplifier 8 includes a normal dispersion fiber amplifier. In another embodiment, fiber amplifier 8 includes a non-normal dispersion fiber.

Nonlinear fiber 12 is a polarization maintaining highly nonlinear fiber that receives the amplifier frequency comb 10 and produces spectrally broadens amplifier frequency comb 10 to an octave to produce spectrally broadened frequency comb 14.

Frequency doubler 16 includes nonlinear optic 82. Nonlinear optic 82 can be a waveguide such as a nonlinear crystal. An exemplary nonlinear crystal is a periodically poled lithium niobate (PPLN) crystal. Spectrally broadened frequency comb 14 (which can be a full octave-spanning spectrum) is coupled into nonlinear optic 82, which frequency doubles fundamental frequencies in spectrally broadened frequency comb 14 to doubled frequencies such that doubled frequency comb 18 includes the fundamental frequencies and doubled frequencies. Frequency doubler 16 can include a thermoelectric cooler disposed on nonlinear optic 82 to tune a temperature of nonlinear optic 82 to optimize doubling efficiency of nonlinear optic 82.

Doubled frequency comb 18 is communicated from frequency doubler 16 to interferometer 20. Interferometer 20 includes in-line interferometer fiber 84. Interferometer fiber 84 includes a polarization maintaining fiber that has a differential delay between a fast axis and slow axis of the polarization maintaining fiber. Interferometer fiber 84 can be formed by splicing, e.g., at a 45° rotation, a first polarization maintaining fiber connected to band pass filter 92 to a second polarization maintaining fiber connected to polarizing beam splitter 86. In this configuration, interferometer fiber 84, projects the fundamental frequencies and doubled frequencies of doubled frequency comb 18 onto both of the fast and slow axes of interferometer fiber 84. The federal frequencies and doubled frequencies propagating in the fast and slow axes of interferometer fiber 84 are combined together via polarizing beam splitter 86 oriented that is at 45 degrees to produce signal frequency comb 22. Signal frequency comb 22 output from polarizing beam splitter 86 includes the temporally overlapped and spatially overlapped fundamental frequencies and doubled frequencies that can be communicated to, e.g., a balanced detector to produce a signal that includes a frequency of a carrier envelope offset $f_{ceo}$ from the fundamental and doubled frequencies in signal frequency comb 22. Further, it is contemplated that a ratio of a length of interferometer fiber 84 to a length of fiber 80 (between nonlinear fiber 12 and nonlinear optic 82) can be, e.g., from 1:10 to 20:1. In some embodiments, the ratio is 10:1.

Frequency comb article 2 includes a plurality of fibers (e.g., 34, 36, 52, 54, 66, 68, 12, 80, 91, 90, 84, 42, 46, 62, 64, 78, 76, and the like). According to an embodiment, such fibers are polarization maintaining single mode fibers. Exemplary fibers include anomalous dispersion Er-doped fiber, normal dispersion Er-doped fiber, highly nonlinear fiber, low gain Er-doped fiber, high gain Er-doped fiber, and the like. The fiber can include an elliptical core, elliptical cladding, panda profile, bow-tie profile, and the like to provide stress to the core of the fiber for polarization maintaining fibers. In a particular embodiment, the fiber include Panda-type stress rods to provide a difference in index between the fast axis and slow axis. In a certain embodiment, a gain medium in oscillator 4 and fiber amplifier 8 is provided by erbium (Er) doped fibers. In some embodiment, standard telecommunications Panda PM-980 and PM-1550 fibers are used. In a certain embodiment, the polarization maintaining fibers are spliced, e.g., with a polarization maintaining fiber fusion splicer.

Connectors (e.g., 44, 58, 60, 72, 74, 88, 89, 98, and the like), isolators (e.g., 48, 56, and the like), wavelength division multiplexers (e.g., 70, 88, and the like), and the like can include single mode fiber having an end of the respective fiber that is polished and mates with another fiber. Exemplary polishing include physical contact (PC), super physical contact (SPC), ultra physical contact (UPC), angled physical contact (APC), and the like such that the connectors can be a PC, APC, SPC, or UPC connector. It is contemplated that when two fibers are joined without a connector, the two fibers can be connected by splicing the fibers together. In this manner, frequency comb article 2 is entirely fiber-based from first oscillator fiber 34 to fiber 100 connected to interferometer 20, and frequency combs (e.g., 6, 10, 14, 18, and 22) propagate in fiber in frequency comb article 2 in an absence of free-space propagation.

In an embodiment, a process for making frequency comb article 2 includes providing oscillator 4 by disposing first mirror 102 and a distance from second mirror 104 and interposing first oscillator fiber 34 therebetween, disposing lenses 114, 120 and optics was 16, 118 between first mirror 102 and first oscillator fiber 34, disposing second oscillator fiber between first oscillator fiber 34 and second mirror 104, and splicing together proximate ends of first oscillator fiber 34 and second oscillator fiber 36 to form oscillator 4. The process also includes fiber optically connecting amplifier fiber 52 oscillator 4, fiber optically connecting nonlinear fiber 12 to amplifier fiber 50, fiber optically connecting nonlinear optic 82 to nonlinear fiber 12, fiber optically connecting band pass filter 92 to nonlinear optic 82, fiber optically connecting interferometer fiber 84 to nonlinear optic 82, and fiber optically connecting polarizing beam splitter 86 two interferometer fiber 84 to make frequency comb article 2.

Figure 10:
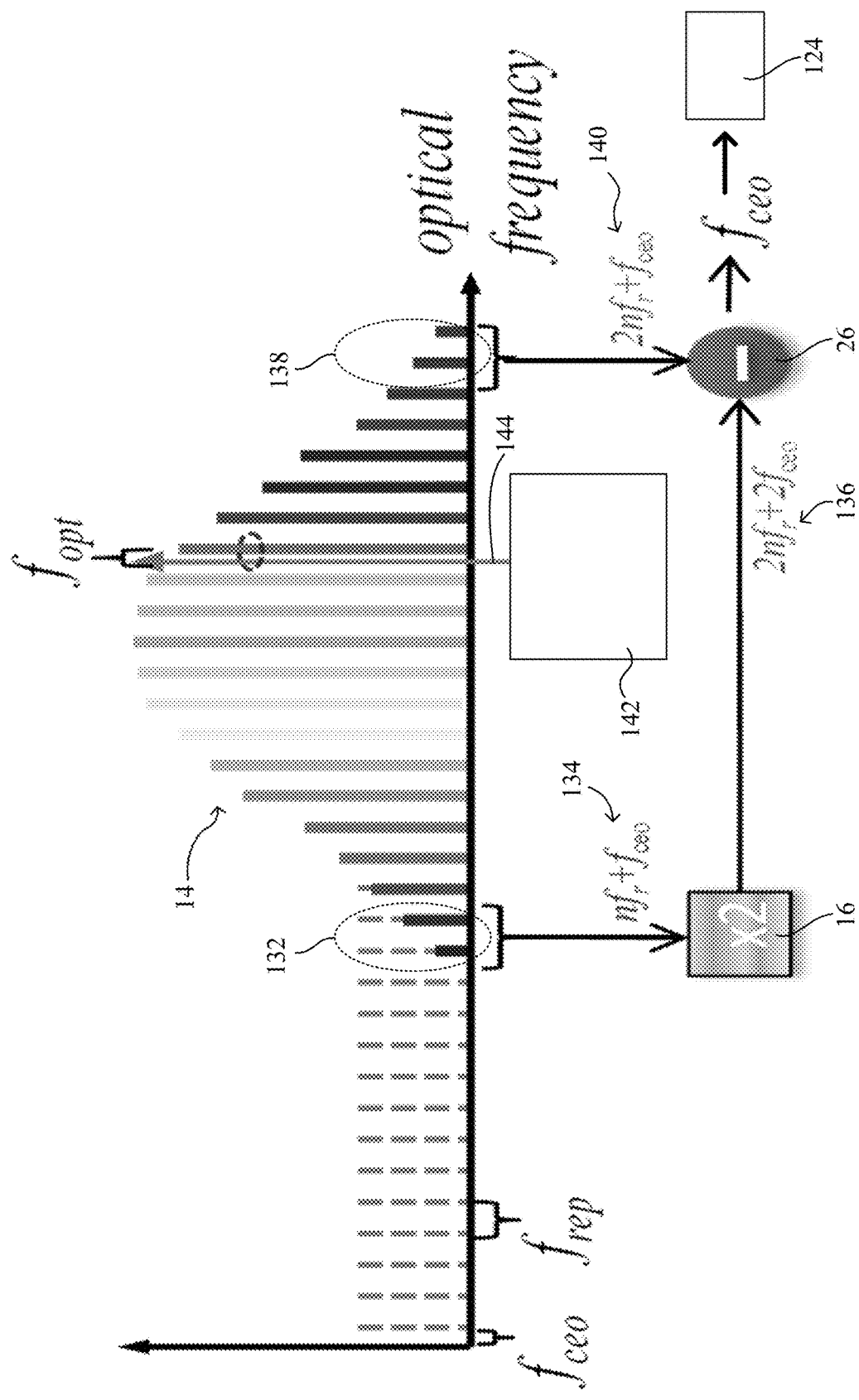
FIG. 10 shows an exemplary production of $f_{opt}$ and $f_{ceo}$.

According to an embodiment, a process for producing amplified frequency comb 10 includes introducing pump radiation 110 to a first optical member 30; reflecting pump radiation 110 between first optical member 30 and second optical member 32 to produce oscillator frequency comb 6; and communicating oscillator frequency comb 6 from oscillator 4 to fiber amplifier 8; introducing amplifier radiation 122 (see FIG. 10) to fiber amplifier 8 to produce amplifier frequency comb 10. The process also includes communicating amplifier frequency comb 10 to nonlinear fiber 12; spectrally broaden amplifier frequency comb 10 to produce spectrally broadened frequency comb 14; communicating spectrally broadened frequency comb 14 to frequency doubler 16; doubling a plurality of fundamental frequencies in spectrally broadened frequency comb 14 to produce doubled frequency comb 18 that includes the plurality of fundamental frequencies and a plurality of doubled frequencies; and communicating doubled frequency comb 18 from frequency doubler 16 to band pass filter 92, interferometer fiber 84, polarizing beam splitter 86 to produce a signal frequency comb 22 that includes the plurality of doubled frequencies that is temporally overlapped and spatially overlapped with the plurality of fundamental frequencies.

Figure 6:
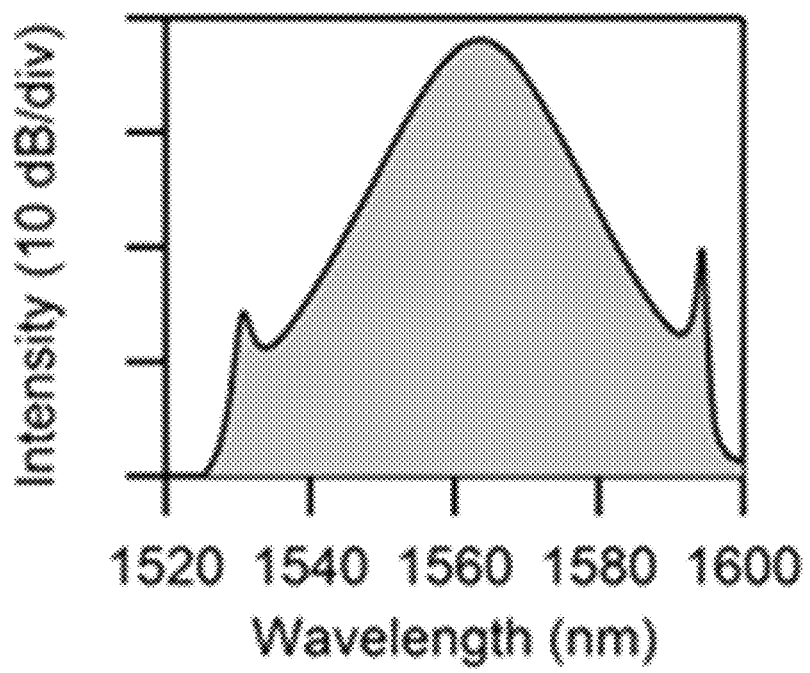
FIG. 6 shows a graph of intensity versus wavelength.
Figure 7:
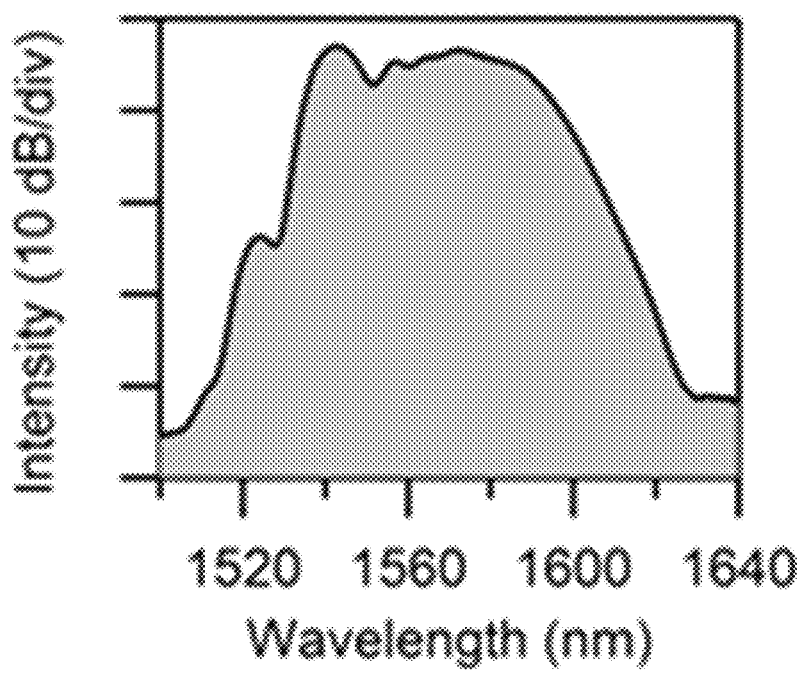
FIG. 7 shows a graph of intensity versus wavelength.
Figure 8:
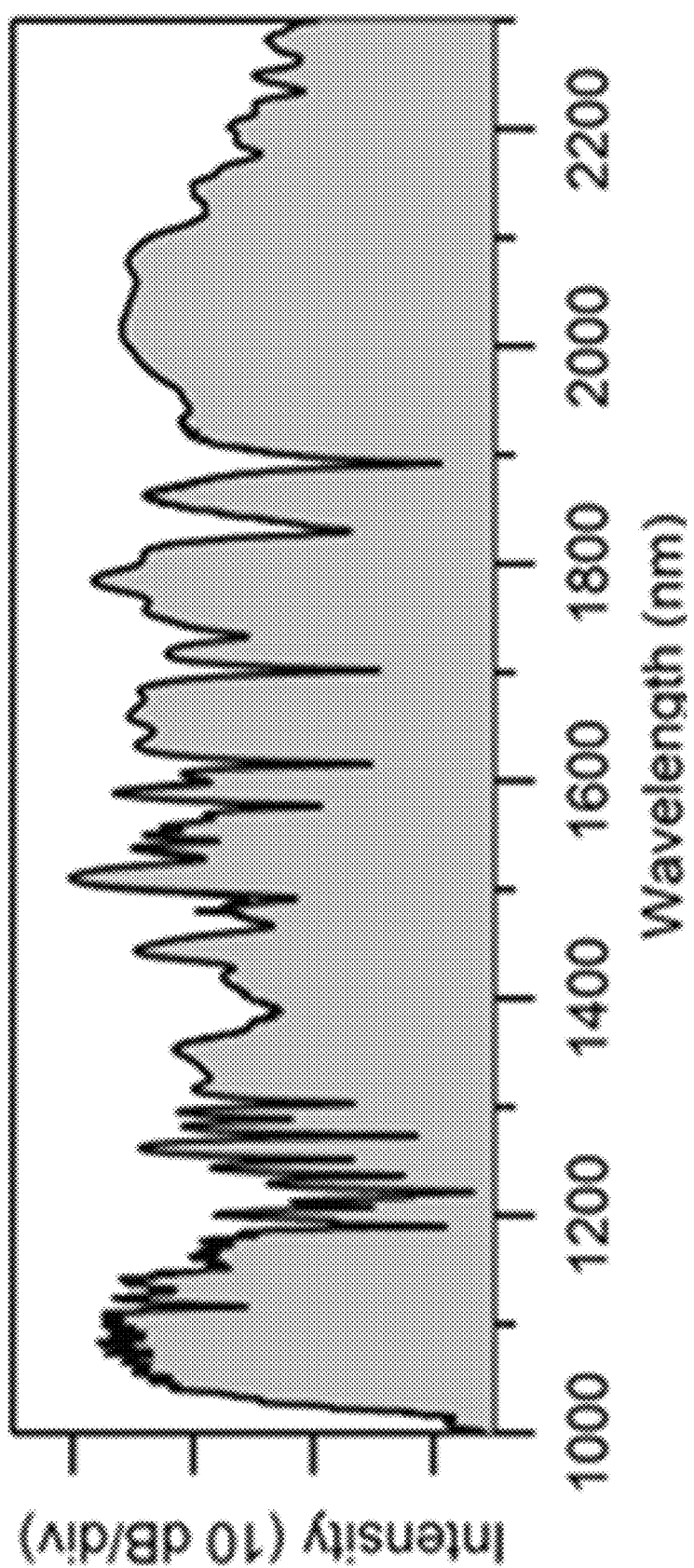
FIG. 8 shows a graph of intensity versus wavelength.

An exemplary oscillator frequency comb is shown in FIG. 6, which is a graph of intensity versus wavelength. Likewise, an exemplary amplifier frequency comb is shown in FIG. 7, which is a graph of intensity versus wavelength. Similarly, an exemplary spectrally broadened frequency comb is shown in FIG. 8, which is a graph of intensity versus wavelength. Each frequency comb includes a plurality of frequencies (also referred to as teeth or comb teeth) spaced apart by a repetition frequency $f_{rep}$. In an embodiment, repetition frequency $f_{rep}$ is constant among teeth in each individual frequency comb and constant among all frequency combs (6, 10, 14, 18, and 22).

Figure 9:
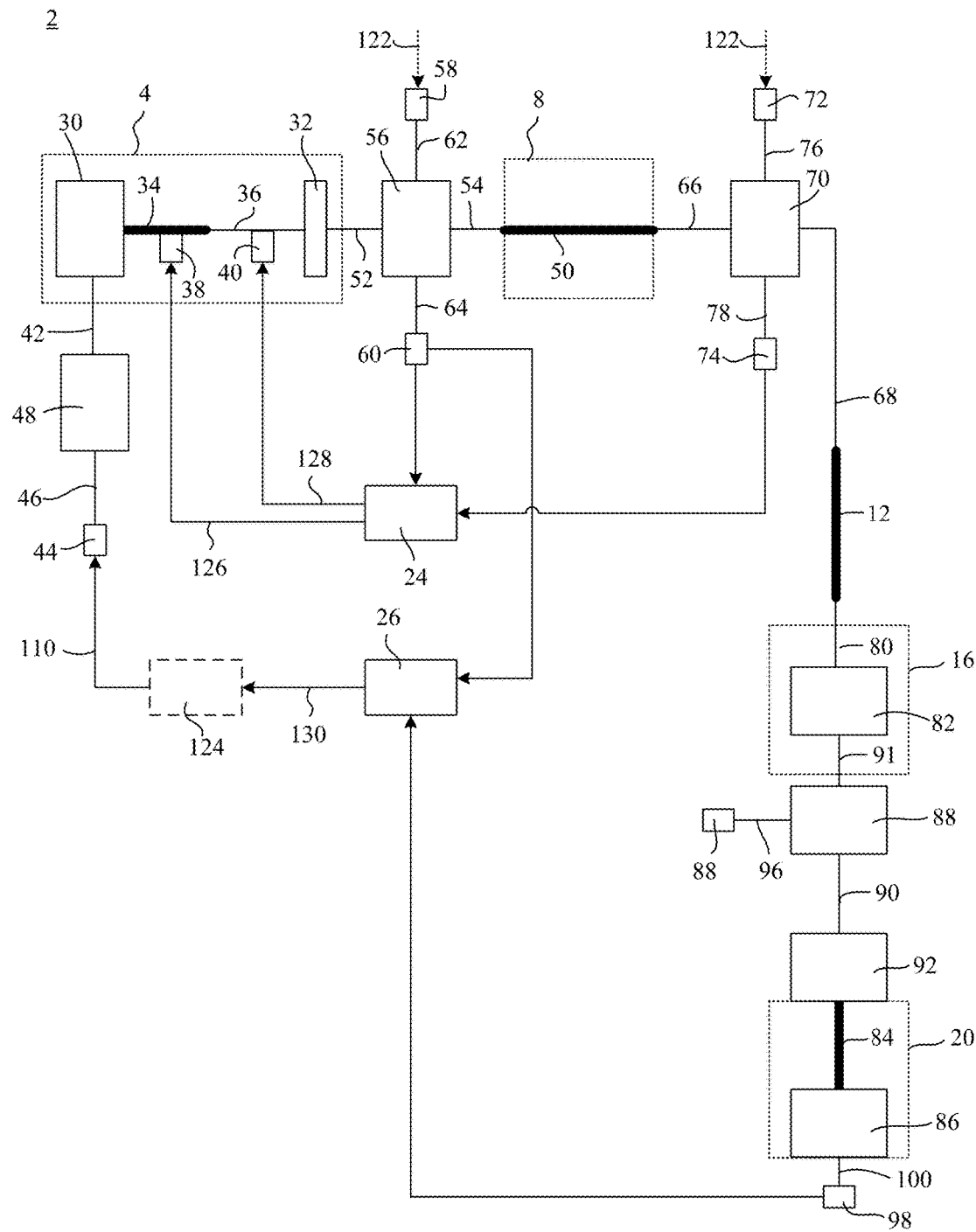
FIG. 9 shows an embodiment of a frequency comb article.

Frequency combs (oscillator frequency comb 6, amplifier frequency comb 10, spectrally broaden frequency comb 14, doubled frequency comb 18, and signal frequency comb 22) have two degrees of freedom, namely, a frequency spacing between adjacent teeth (referred to herein as repetition frequency $f_{rep}$) and a translation of the comb teeth. In an absence of stabilization of oscillator frequency comb 6, these two degrees of freedom can vary in frequency combs (6, 10, 14, 18, and 22). According to an embodiment, frequency combs (6, 10, 14, 18, and 22) are stabilized by stabilizing oscillator frequency comb 6 to maintain a constant frequency spacing (repetition frequency $f_{rep}$) among comb teeth in oscillator frequency comb 6 and to maintain a constant carrier envelope offset frequency $f_{ceo}$. According to an embodiment, a process for stabilizing oscillator frequency comb 6 includes self-referencing oscillator frequency comb 6. With reference to FIG. 9, stability of frequency combs (6, 10, 14, 18, and 22) can be controlled by providing oscillator frequency comb 6 and amplifier frequency comb 10 to first controller 24. In response to receiving frequency combs (6, 10), first controller 24 produces a first control signal and a second control signal, which are based on repetition frequency $f_{ref}$ and heterodyne frequency $f_{opt}$, based respectively on oscillator frequency comb 6 and amplifier frequency comb 10. Further the process for stabilizing includes communicating the first control signal from first controller 24 to first mechanical transducer 38; communicating the second control signal from first controller 24 to second mechanical transducer 40; subjecting first oscillator fiber 34 to a flexural stress produced by first mechanical transducer 38 in response to receiving the first control signal; subjecting second oscillator fiber 36 to a flexural stress produced by second mechanical transducer 40 in response to receiving the second control signal; providing signal frequency comb 22 to second controller 26; producing (by second controller 26) a third control signal, based on signal frequency comb 22; communicating the third control signal from second controller 26 to pump laser 124 to control pump laser 124 (e.g., via third control line 130); producing pump radiation 110 from laser 124 in response to receipt of the third control signal from second controller 26; and introducing pump radiation 110 to first optical member 30 of oscillator 4 from pump laser 124 to stabilize by self referencing frequency combs (6, 10, 14, 18, 22).

Here, with reference to FIG. 9, self-referencing includes producing spectrally broadened frequency comb 14 (e.g., a frequency comb having an octave spanning spectrum); providing fundamental frequencies 134 from low-frequency portion 132 of spectrally broadened frequency comb 14 to frequency doubler 16 to produce doubled frequencies 136; providing doubled frequencies 136 and high frequencies 140 from high-frequency portion 138 of spectrally broadened frequency comb 14 to second controller 26; and comparing doubled frequencies 136 to high frequencies 138 by detecting (e.g., on a same detector of a second controller 26) doubled frequencies 136 and high frequencies 138 to produce carrier envelope offset frequency $f_{ceo}$; which can be provided to pump laser 124 to lock out a translation of comb teeth in oscillator frequency comb 6.

Additionally, self-referencing includes producing fully stabilized oscillator frequency comb 6. Further, comb modes of oscillator 4 are simultaneously controlled by stabilization of the two degrees of freedom of oscillator frequency comb 6. In a certain embodiment, carrier envelope offset frequency $f_{ceo}$ and a comb mode are stabilized to optical standard 142 (see FIG. 10), e.g., a cavity-stabilized laser, that produces reference frequency 144. This optical stabilization provides phase coherence across an optical spectrum of oscillator frequency comb 6. Accordingly, heterodyne frequency $f_{opt}$ between an $n_0^{th}$ comb mode and reference frequency 144 in combination with carrier envelope offset frequency $f_{ceo}$ is used to stabilize oscillator frequency comb 6, wherein heterodyne frequency $f_{opt}$ and carrier envelope offset frequency $f_{ceo}$ are independently a radiofrequency (RF).

. In a certain embodiment, second controller 26 produces carrier envelope offset frequency $f_{ceo}$ signal to control pump laser 124 by a 1f-to-2f process involving signal frequency comb 22. First controller 24 produces heterodyne frequency $f_{opt}$ and also a first control signal and second control signal respectively for first mechanical transducer 38 and second mechanical transducer 40 disposed respectively on first oscillator fiber 34 and second oscillator fiber 36. In this manner, an optical mode supported by oscillator 4 is selected by control of first mechanical transducer 38 and second mechanical transducer 40.

Figure 11:
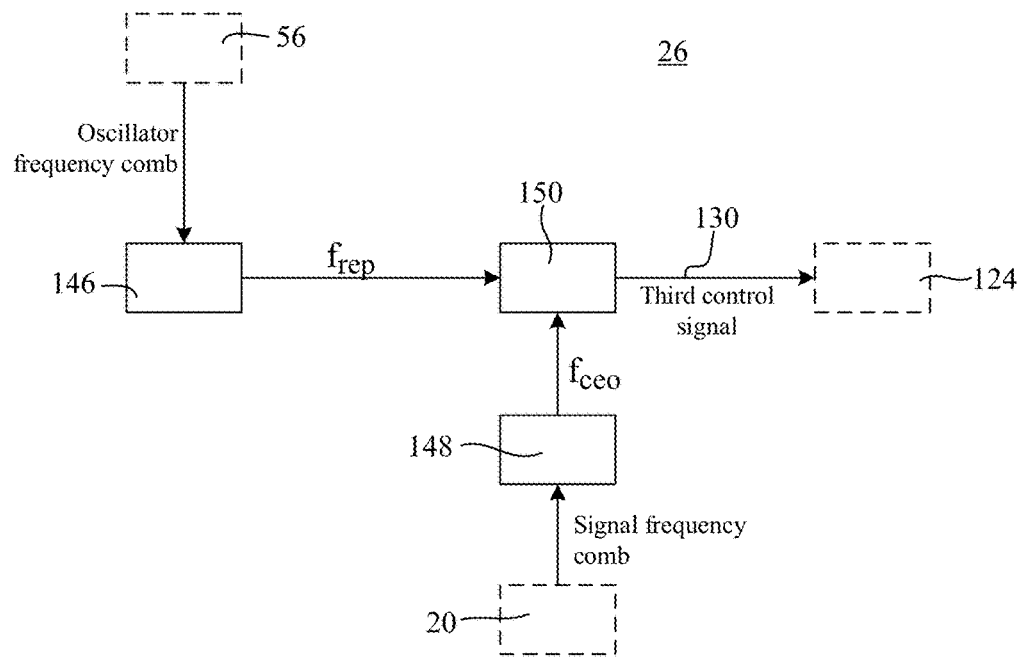
FIG. 11 shows an embodiment of a second controller.
Figure 12:
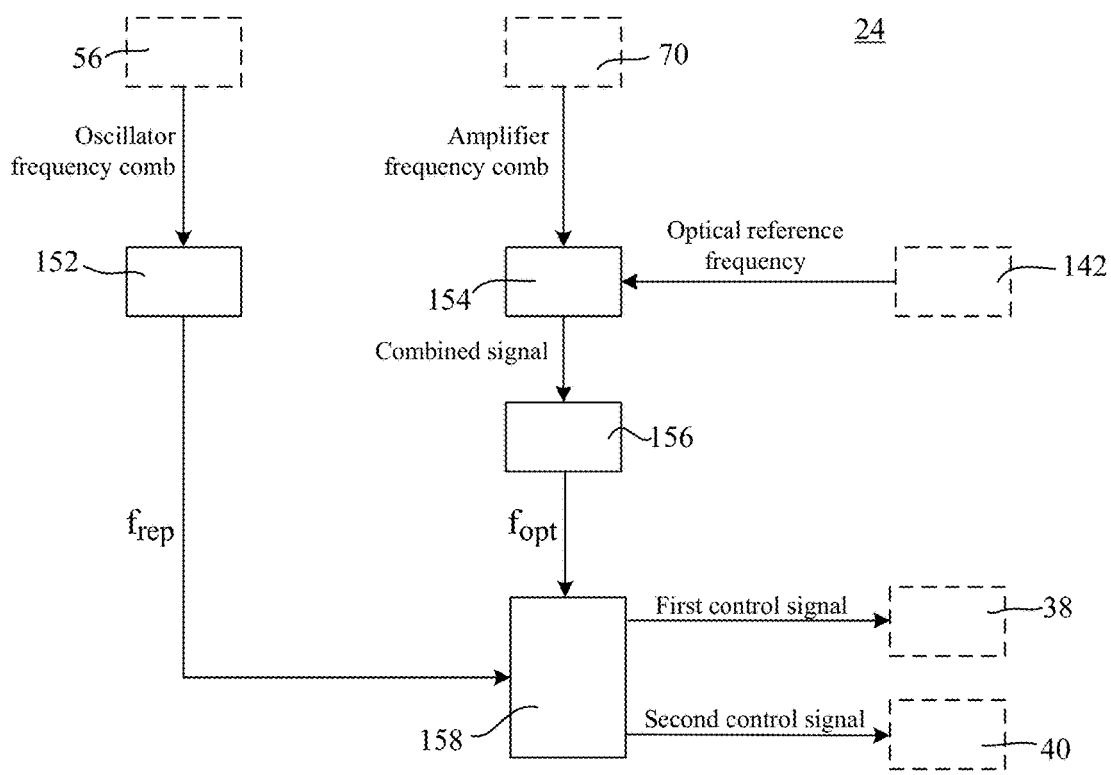
FIG. 12 shows an embodiment of a first controller.

According to an embodiment, a process for stabilizing frequency comb 6 includes self-referencing frequency comb article 2 by optically stabilizing oscillator frequency comb 6 to optical standard 142 (see FIG. 10 and FIG. 12) such that oscillator frequency comb 6 is optically coherent and has a femtosecond-level (i.e., much less than 1 picosecond, e.g., 5 femtosecond) timing jitter. The process includes phase locking carrier envelope offset frequency $f_{ceo}$ and heterodyne frequency $f_{opt}$ to an RF frequency derived from repetition frequency $f_{rep}$. Here, phase locking includes producing a phase-locked loop around carrier envelope offset frequency $f_{ceo}$ and heterodyne frequency $f_{opt}$. With reference to FIG. 11 and FIG. 12, second controller 26 is configured to phase lock carrier envelope offset frequency $f_{ceo}$, and first controller 24 is configured to phase lock heterodyne frequency $f_{opt}$.

As shown in FIG. 11, second controller 26 includes first detector 146 (e.g., a photodetector such as a photodiode) in optical communication with oscillator 4 and configured to receive oscillator frequency comb 6 from oscillator 4 via isolator 56 at connector 60 and also configured to produce repetition frequency $f_{rep}$ in response to receiving oscillator frequency comb 6; second detector 148 (e.g., a balanced detector) in optical communication with interferometer 20 and configured to receive signal frequency comb 22 from interferometer 20 and also configured to produce carrier envelope offset frequency $f_{ceo}$ in response to receiving signal frequency comb 22; and receiver 150 in electrical communication with first detector 146 and second detector 148 and configured to receive repetition frequency $f_{rep}$ from first detector 146 and carrier envelope offset frequency $f_{ceo}$ from second detector 148 and configured to produce the third control signal, which is communicated to pump laser 124 for production of pump radiation 110 and introduction of pump radiation 110 oscillator 4.

As shown in FIG. 12, first controller 24 includes detector 152 (e.g., a photodetector such as a photodiode) in optical communication with oscillator 4 and configured to receive oscillator frequency comb 6 from oscillator 4 via isolator 56 at connector 60 and also configured to produce repetition frequency $f_{rep}$ in response to receiving oscillator frequency comb 6; combiner 154 in optical communication with filter amplifier 8 and optical standard 142 (e.g., a cavity stabilized laser) and configured to receive amplifier frequency comb 10 from filter amplifier 8 via wavelength division multiplexer 70, to receive an optical reference frequency from optical standard 142, and to produce a combined signal in response to receiving amplifier frequency comb 10 and the optical reference frequency; detector 156 in optical communication with combiner 154 and configured to receive the combined signal from detector 156 and to produce heterodyne frequency $f_{opt}$ in response to receiving the combined signal; receiver 158 to receive repetition frequency frep and heterodyne frequency respectively from detector 152 and detector 156 and to produce the first control signal and the second control signal, the first control signal being communicated to the first mechanical transducer 38, and the second control signal being communicated to second mechanical transducer 40, wherein first mechanical transducer 38 and second mechanical transducer 40 8R respectively disposed on first oscillator fiber 34 and second oscillator fiber 36.

Accordingly, carrier envelope offset frequency $f_{ceo}$ is phase-locked via feedback to pump laser 124 that provides pump radiation 110 to oscillator 4, and heterodyne frequency $f_{opt}$ is phase-locked via feedback to a length of oscillator 4. In a certain embodiment, a length of oscillator 4 is controlled by providing the first control signal to first mechanical transducer 38 (e.g., a slow piezoelectric transducer (PZT)) and the second control signal to second mechanical transducer 40 (e.g., a fast (PZT)) fasteningly disposed (e.g., glued) to first oscillator fiber 34 and second oscillator fiber 36. It is contemplated that this phase locked loop involving carrier envelope offset frequency $f_{ceo}$ and heterodyne frequency $f_{rep}$ has a large dynamic range and a large feedback bandwidth respectively to avoid phase-slips and to suppress noise. It is contemplated that phase locking can include op-amp based analog control electronics. In an embodiment, phase locking includes digital signal processing for the phase lock and a standardized design for high-bandwidth length control of oscillator 4 accomplished by subjecting the first control signal the second control signal to first mechanical transducer 38 and second mechanical transducer 40.

Figure 13:
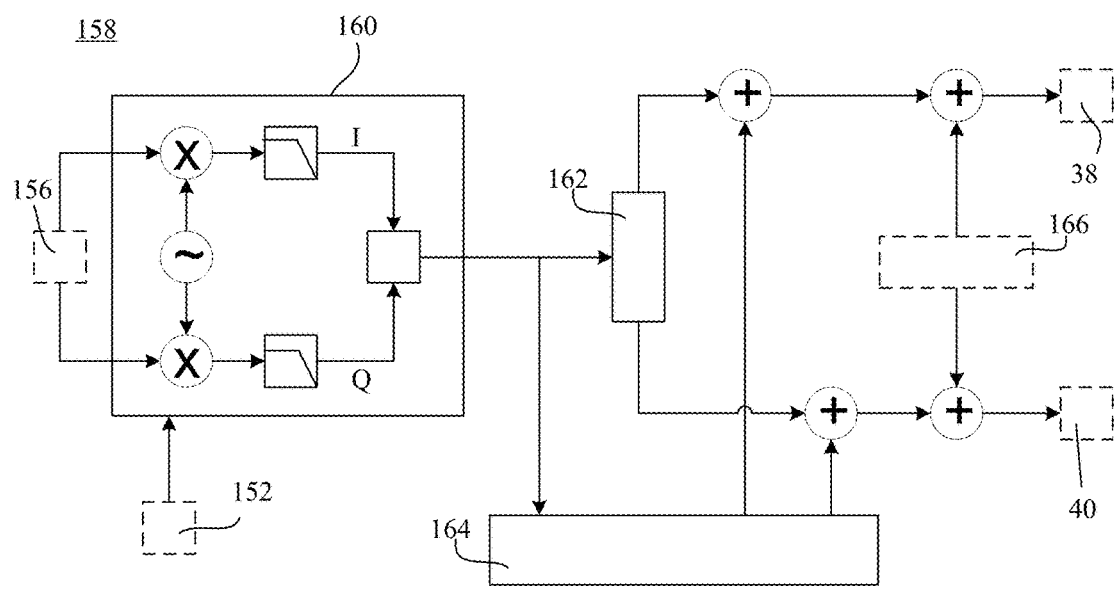
FIG. 13 shows a first control circuit.
Figure 14:
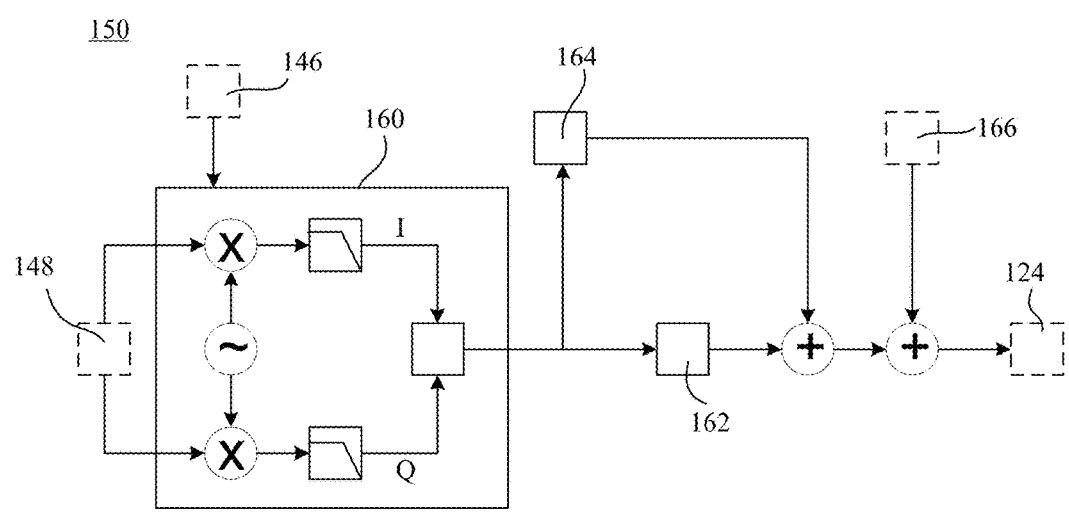
FIG. 14 shows a second control circuit.

In a particular embodiment, first controller 24 and second controller 26 are disposed in a container or provided an electrical article such as a field programmable gate array FPGA to implement digital signal processing. Digital signal processing provides for unwrapping and continuous tracking of phase excursions (e.g., of $10^6$ radians or more), and continuous tracking avoids a phase slip from an environmental perturbation. In addition, providing first controller 24 and second can control 26 with digital signal processing provides immunity to electro-magnetic interference. First controller 24 and second controller 26 also provide selective tuning of parameters for the phase lock loop as well as adjustment of a lock frequency or filter bandwidth. With reference to FIG. 13 (receiver 158) and FIG. 14 (receiver 150), receiver (158, 150) includes an input analog-to-digital converter (ADC, not shown), an in-phase and quadrature (IQ) detection module 160 to detect phase, loop filter 162, an output digital-to-analog converter (DAC, not shown), and a real-time diagnostic through a zero-deadtime frequency counter, a phase-noise analyzer, and vector network analyzer 164 (VNA) for transfer function measurements. An offset (e.g., voltage, current, frequency, and the like) can be provided at offset input member 166. Here, carrier envelope offset frequency $f_{ceo}$ and heterodyne frequency $f_{opt}$ are mixed down via IQ detection against phase lock frequency $qf_{rep}$ (which can be different for the two phase locks). For self-referencing, phase lock frequency $qf_{rep}$ is derived from $f_{rep}$ and q=M/N, where M is an integer and $N=2^{48}$. A phase of a baseband signal is determined using an arctangent operation and unwrapped (not shown in the diagram), e.g., to $\pm 3 \times 10^6$ radians of linear range, to provide linear behavior under significant perturbations. It is contemplated that, a frequency or a phase excursion present from an environmental perturbation to frequency comb article is less than an input filter bandwidth (e.g., 25 MHz) such that frequencies are tracked, and phase is recovered without $2\pi$ ambiguities. Loop filter 162 can be a tunable proportional-integral-derivative PID filter, whose derivative term provides extending a locking bandwidth beyond a first pole of the laser for a lock for carrier envelope offset frequency $f_{ceo}$. VNA 164 provides measurement of a transfer function and real-time monitoring of residual lock phase noise. In some embodiments, receiver (158 or 150) also includes a zero dead time, triangular averaging frequency counter (e.g., operational at a selected daytime such as a one second gate time) to monitor long-term performance of frequency comb article 2.

According to an embodiment, tuning the length of oscillator 4 provides feedback to control heterodyne frequency $f_{opt}$, which is achieved providing the first control signal and the second control signal respectively to first mechanical transducer 38 and second mechanical transducer 40 disposed on first oscillator fiber 34 and second oscillator fiber 36. First mechanical transducer 38 and second mechanical transducer 40 produce a flexural stress respectively subjected to first oscillator fiber 34 and second oscillator fiber 36 in response to receiving the first control signal and the second control signal. Here, first mechanical transducer 38 and second mechanical transducer 40 can be a PZT fiber stretcher, wherein first mechanical transducer 38 is a fast PZT fiber stretcher, and second mechanical transducer 40 is a slow PZT fiber stretcher (e.g., a long-travel PZT). In this configuration, first mechanical transducer 38 is configured to modulate the length of oscillator 4, e.g., with up to 100 kHz of feedback bandwidth, and second mechanical transducer 40 is configured to modulate the length of oscillator 4 at a selected bandwidth (e.g., less than 1 kHz bandwidth) to provide a selected dynamic range that corresponds to modulation of heterodyne frequency fopt at, e.g., 600 MHz.

Figure 15A:
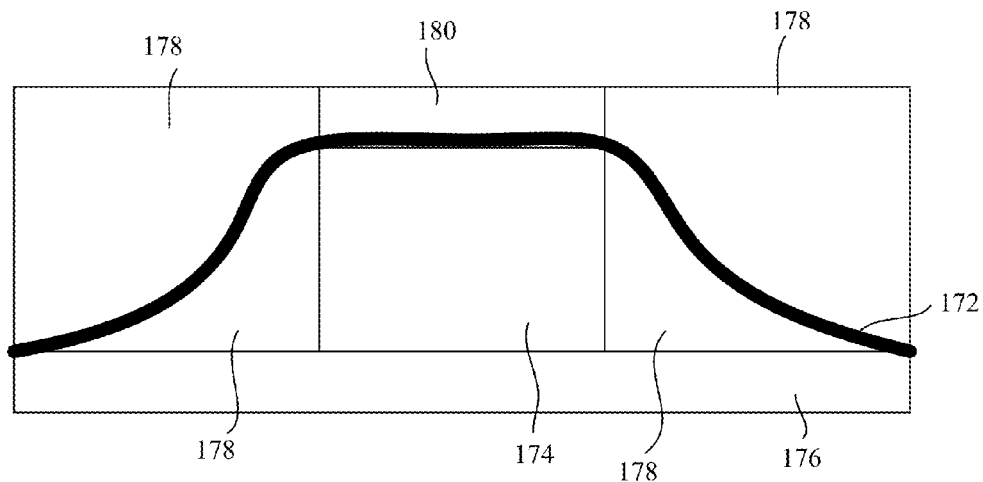
FIGS. 15A and 15B show a mechanical transducer disposed on a fiber.
Figure 15B:
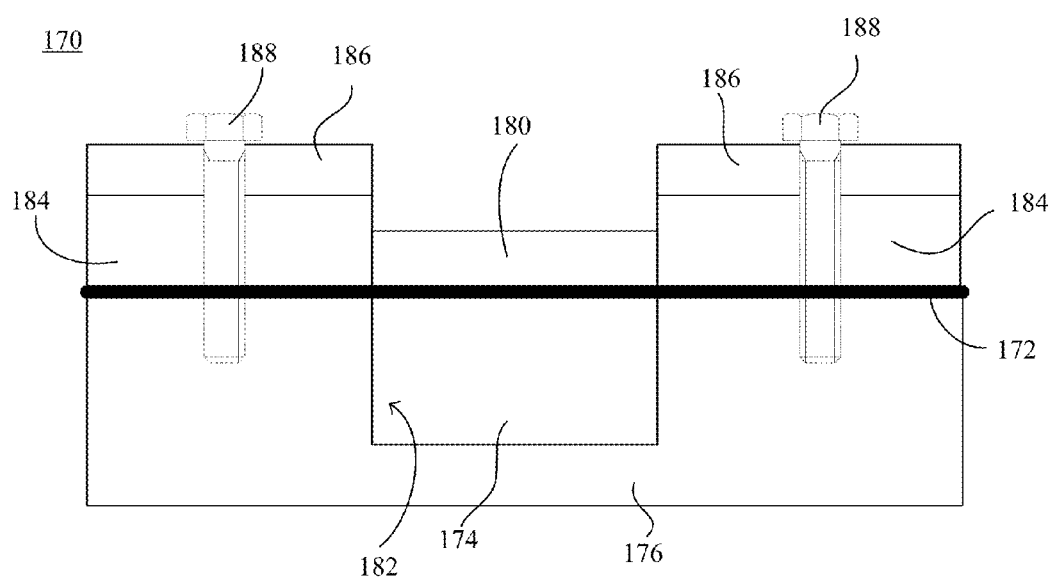

First mechanical transducer 38 and second mechanical transducer 40 independently can be disposed on first oscillator fiber 34 or second oscillator fiber 36 in numerous ways, e.g., as shown in FIGS. 15A (free-standing mount 168) and 15B (pocket mount 170).

In freestanding mount 168 and pocket mount 170, oscillator fiber 172 (e.g., 34 or 36) is disposed along an axis of mechanical transducer 174 (e.g., 38 or 40), which can be, e.g., a 2 mm$^3$ cubestack PZT), which is disposed on substrate 176, e.g., a common base for frequency comb article 2. It is contemplated that an arc is present along oscillator fiber 172 proximate to an edge of mechanical transducer 174 to provide dynamic range of motion for oscillator fiber 172 and to prevent compression of oscillator fiber 172. Oscillator fiber 172 is attached to mechanical transducer 174, e.g., with adhesive 180 such as epoxy.

Freestanding mount 168 also includes material 178 (e.g., a viscoelastic material such as modeling clay) disposed around oscillator fiber 172 to dampen a mechanical resonance motion in oscillator fiber 172.

Pocket mount 170 includes pocket 182 in which mechanical transducer 174 is disposed, material 184 (e.g., elastomeric polymer such as rubber) to dampen a mechanical resonance and interposed between substrate 176 and mount plate 186 (e.g., an aluminum plate), which is fastened to substrate 176 with fastener 188 (e.g., a screw or the like).

In an embodiment, a cooler (e.g., a thermoelectric cooler) is disposed in thermal contact with oscillator 4. The cooler can control it temperature of oscillator 4 to within a selected temperature window such as within 0.3° C. of an operating temperature. The cooler can be disposed on substrate 176 for efficient heat transfer between the cooler and oscillator 4 as well as other components of frequency comb article 2. A thermistor can be used to monitor temperature of frequency comb article 2. A temperature control loop is used to adjust a temperature to a temperature set point to maintain a temperature of mechanical transducer 174.

Figure 16A:
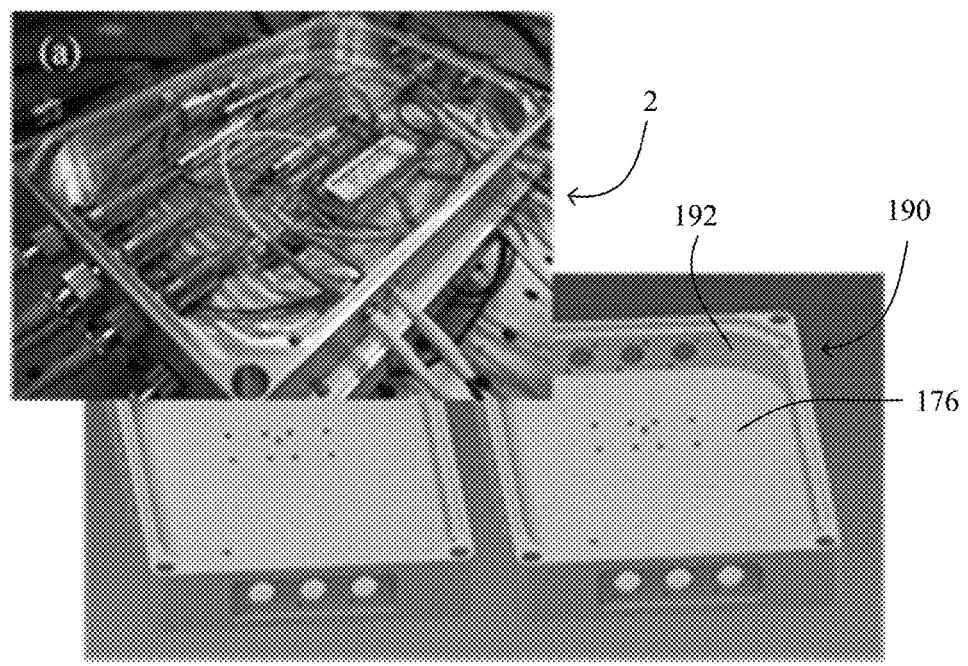
FIGS. 16A and 16B show an embodiment of a frequency comb article.
Figure 16B:
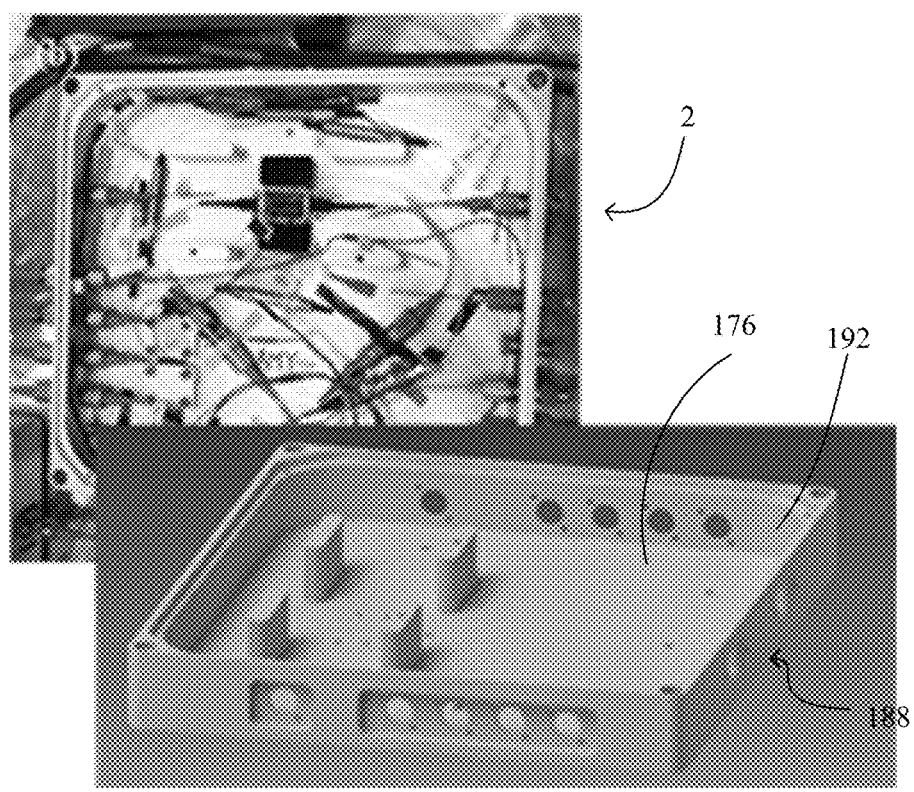

According to an embodiment, with reference to FIGS. 16A and 16B, frequency comb article 2 includes housing 190 in which oscillator 4, fiber amplifier 8, nonlinear fiber 12, frequency doubler 16, and interferometer 20 are disposed. Housing 190 can include substrate 176, wall 192, and top (not shown) to enclose frequency comb 2 within housing 190. Housing 190 can include a metal (e.g., aluminum), plastic (e.g., a thermoplastic or thermoset), and the like. In a particular embodiment, optical components of frequency comb article 2 are disposed in a plurality of housings 190 as shown in FIG. 16A and interconnected for optical communication by a patch cable. In some embodiments, optical components of frequency comb article 2 are disposed in a single housing 190 as shown in FIG. 16B.

Fibers (e.g., 34, 36, 42, 46, 50, 52, 54, 62, 64, 66, and the like) and other components (e.g., isolators, wavelength division multiplexers, and the like) of frequency comb article 2 are disposed in housing 190, wherein certain components of frequency comb article 2 are attached to housing 190 with an adhesive, e.g., room temperature vulcanization silicone. In an embodiment, components of frequency comb article 2 can be potted inside housing 190 by a potting agent such as silicone epoxy that can be disposed to an internal volume of housing 190 to cover components of frequency comb article 2 to provide vibration dampening. Such epoxy can be electrically insulating or soft, e.g., with a Shore A hardness that is indicated as soft gel.

Frequency comb article 2 has numerous benefits and advantages. Frequency comb article 2 includes polarization maintaining optical fiber, a saturable absorber for mode locking, high signal-to-noise ratio (SNR) detection of a control signal, digital feedback control for frequency stabilization, and the like. Oscillator frequency comb 6 as wells as frequency combs produced from the oscillator frequency comb 6 is phase-coherent, and spectrally broadened frequency comb 14 has includes a 1 micrometer ($\mu m$) to 2 $\mu m$ octave-spanning spectrum with a selectable pulse repetition rate e.g., 200 MHz, and a pulse-to-pulse timing jitter that is less than 3 femtoseconds. Digital control for frequency comb article 2 provides phase coherent operation for over 90 hours and can be used for phase-sensitive applications such as timekeeping. Moreover, frequency comb article 2 exhibits phase-slip free operation. Additionally, frequency comb article 2 is scalable in size and portable.

Frequency comb article 2 includes components that provide stable operation and a selected power of frequency combs (e.g., oscillator frequency comb 6). Oscillator 4 can have an intra-oscillator power from 20 milliwatts (mW) to 100 mW, specifically from 30 mW to 80 mW, and more specifically from 40 mW to 70 mW. A pulse intensity at a surface of the first optical member 30 (e.g., SESAM) is from 50 micro Joules per square centimeter ($\mu J/cm^2$) to 300 $\mu J/cm^2$, specifically from 100 $\mu J/cm^2$ to 200 $\mu J/cm^2$, and more specifically greater than 100 $\mu J/cm^2$. Additionally, first optical member 102 has a saturation intensity from 50 $\mu J/cm^2$ to 100 $\mu J/cm^2$. A relaxation time constant of first optical member 30 can be from 1 picoseconds (ps) to 5 ps, specifically from 1 ps to 2 ps; a modulation depth from 3% to 20%, specifically from 4% to 12%, and more specifically from 6% to 9%, based on the maximum optical power dependent deviation from perfect reflection A length of Er-doped fiber can be from 5 cm to 50 cm, specifically 6 cm to 25 cm, and more specifically from 8 cm to 18 cm. A length of other fibers in the oscillator 4 can be from 0 cm to 90 cm, specifically 10 cm to 60 cm, and more specifically from 20 cm to 40 cm. A repetition rate of frequency comb article 2 can be from 100 megahertz (MHz) to 400 MHz, specifically from 150 MHz to 350 MHz, and more specifically from 160 MHz to 250 MHz.

Oscillator 4 achieves self-starting mode-locked operation with an optical output from 1 milliwatts (mW) to 30 mW, specifically from 2 mW to 20 mW, and more specifically from 4 mW to 16 mW; a spectral bandwidth from 5 nanometers (nm) to 20 nm, specifically from 7 nm to 16 nm, and more specifically from 9 nm to 12 nm, centered from 1555 nm to 1580 nm, specifically from 1560 nm to 1570 nm, and more specifically from 1560 nm to 1565 nm; and a pulse width from 400 femtoseconds (fs) to 100 fs, specifically from 150 fs to 300 fs, and more specifically from 200 fs to 250 fs.

An optical coherence of the frequency comb article 2 is from 0.1 radians to 3 radians, specifically less than 1.5 radians, and more specifically less than 1 radians in a bandwidth from 150 terahertz (THz) to 300 THz, about a mode at $n=n_0$.

First oscillator fiber 34 and second oscillator fiber 36 in oscillator 4 are anomalous dispersion fibers, first oscillator fiber 34 and second oscillator fiber 36 have a dispersion from −10 ps/nm/km to −20 ps/nm/km, specifically from −12 ps/nm/km to −20 ps/nm/km, and more specifically from −15 ps/nm/km to −20 ps/nm/km, e.g., 17 ps/nm/km at 1550 nm.

Fiber amplifier 50 can include a normal dispersion erbium doped fiber dispersion at 1550 nm from 5 ps/nm/km to 40, specifically from 10 ps/nm/km to 30 ps/nm/km, and more specifically from 15 ps/nm/km to 30 ps/nm/km at and an erbium doping effective for a small signal absorption at 1535 nm from 30 dB/m to 120 dB/m, specifically from 60 dB/m to 100 dB/m, and more specifically from 80 dB/m to 100 dB/m. A length of fiber amplifier 50 can be from 80 cm to 300 cm, specifically, 100 cm to 200 cm, and more specifically 110 cm to 170 cm.

A length of highly nonlinear fiber can be from 10 cm to 2 m, specifically from 15 cm to 60 cm, and more specifically from 25 cm to 40 cm. A dispersion of the highly nonlinear fiber at 1550 nm can be from −1 ps/nm/km to 6 ps/nm/km, specifically from 1 ps/nm/km to 4 ps/nm/km, more specifically from 1.5 ps/nm/km to 3 ps/nm/km.

Frequency doubler 16 is provided to double a long wavelength portion of a comb spectrum to overlap spectrally with a short wavelength spectrum of the comb spectrum.

In an embodiment, when fully stabilized to an optical reference, frequency comb article 2 exhibits a residual pulse-to-pulse timing jitter less than 10 femtoseconds, specifically less than 3 femtoseconds and a residual carrier phase noise at 1550 nm of less than 1 radian, specifically less than 0.5 radian, more specifically less than 0.2 radian and maintains this performance without cycle slips for greater than 9 hours, specifically greater than 30 hours, and more specifically greater than 90 hours.

Frequency comb article 2 has numerous beneficial and advantageous uses. In an embodiment, frequency comb article 2 is operable outside a laboratory environment such as in an industrial setting, moving vehicle, and the like. Frequency comb article 2 can be used in high-resolution frequency-comb spectroscopy, optical time-frequency transfer or precision LADAR, trace gas measurements, high-accuracy LADAR, optical free-space time-and-frequency transfer, mobile atomic optical clocks, and the like.

According to an embodiment, frequency comb article 2 converts an optical clock frequency to an RF frequency. While an optical clock can generate a stable frequency in the hundreds of terahertz range, frequency comb article 2 converts the optical clock frequency into a radiofrequency such that the radiofrequency output can be used with electronics such as instrumentation, e.g., radar equipment. Frequency comb article 2 can be used in an optical clock that is robust, i.e., operated continually without cycle flips or without losing time or in a clock that is operated outside of a laboratory.

An exemplary process for producing a radiofrequency from a frequency comb (e.g., 6, 10, 14, 18, 22) includes producing carrier envelope offset frequency $f_{ceo}$; locking carrier envelope offset frequency $f_{ceo}$ to a stable RF frequency; providing light from an optical clock; stabilizing a frequency comb mode spacing by comparing a tooth from the frequency comb to the optical clock to complete transfer the stability of the optical clock light to the comb teeth in the frequency comb; generating a radiofrequency signal by providing the frequency comb to a detector (e.g., photodiode); detecting beating between individual comb teeth; and generate a stable RF frequency therefrom.

According to an embodiment, a process for comparing a plurality of optical clocks includes locking a first frequency comb article to a first optical clock, the first optical clock being located at a first location; locking a second frequency comb article to a second optical clock, the second optical clock being located at a second location; setting a first repetition rate (i.e., a spacing between comb teeth) of the first frequency comb; setting a second repetition rate of the second frequency comb, the second repetition rate being different than the first repetition rate; transmitting a first comb light from the first optical frequency comb at the first location; receiving the first comb light at the second location to produce a received first comb light; transmitting a second comb light from the second optical frequency comb at the second location; receiving the second comb light at the first location to produce a received second comb light; detecting a first beat signal by beating the first optical clock and the received second comb light; detecting a second beat signal by beating the second optical clock and the received first comb light; determining a first timing information for the first optical clock from the second beat signal; determining a second timing information for the second optical clock from the first beat signal; and further including: determining a link noise of transmitting the first comb light from the second beat signal; determining a link noise of transmitting the second comb light from the first beat signal; and subtracting the second beat signal from the first be signal to cancel the link noise to compare the plurality of optical clocks at the first location or the second location. In an embodiment, the first clock and the second clock are located in different locations.

In an embodiment, a process for performing spectroscopy includes setting a first repetition rate of a first frequency comb; setting a second repetition rate of a second frequency comb, the second repetition rate being different than the first repetition rate such that a separation between a plurality of teeth in the first frequency comb is different than a separation between a plurality of teeth in the second frequency comb; transmitting the first frequency comb through a sample to produce a first transmitted frequency comb; transmitting the second frequency comb through or around the sample to produce a second transmitted frequency comb; interfering the first transmitted frequency comb and the second transmitted frequency comb on a photodetector to produce a sample signal, based on an interference of the first transmitted frequency comb with the second transmitted frequency comb; digitizing the sample signal from the detector; recovering information about the sample from the sample signal, the information comprising quantitative information, qualitative information, or combination comprising lease one of the foregoing information. The sample can include, e.g., an environmental sample such as air, exhaust, pollutants, and the like.

The articles and processes herein are illustrated further by the following Examples, which are non-limiting.

EXAMPLES

Example 1

Frequency Comb Article

Figure 17:
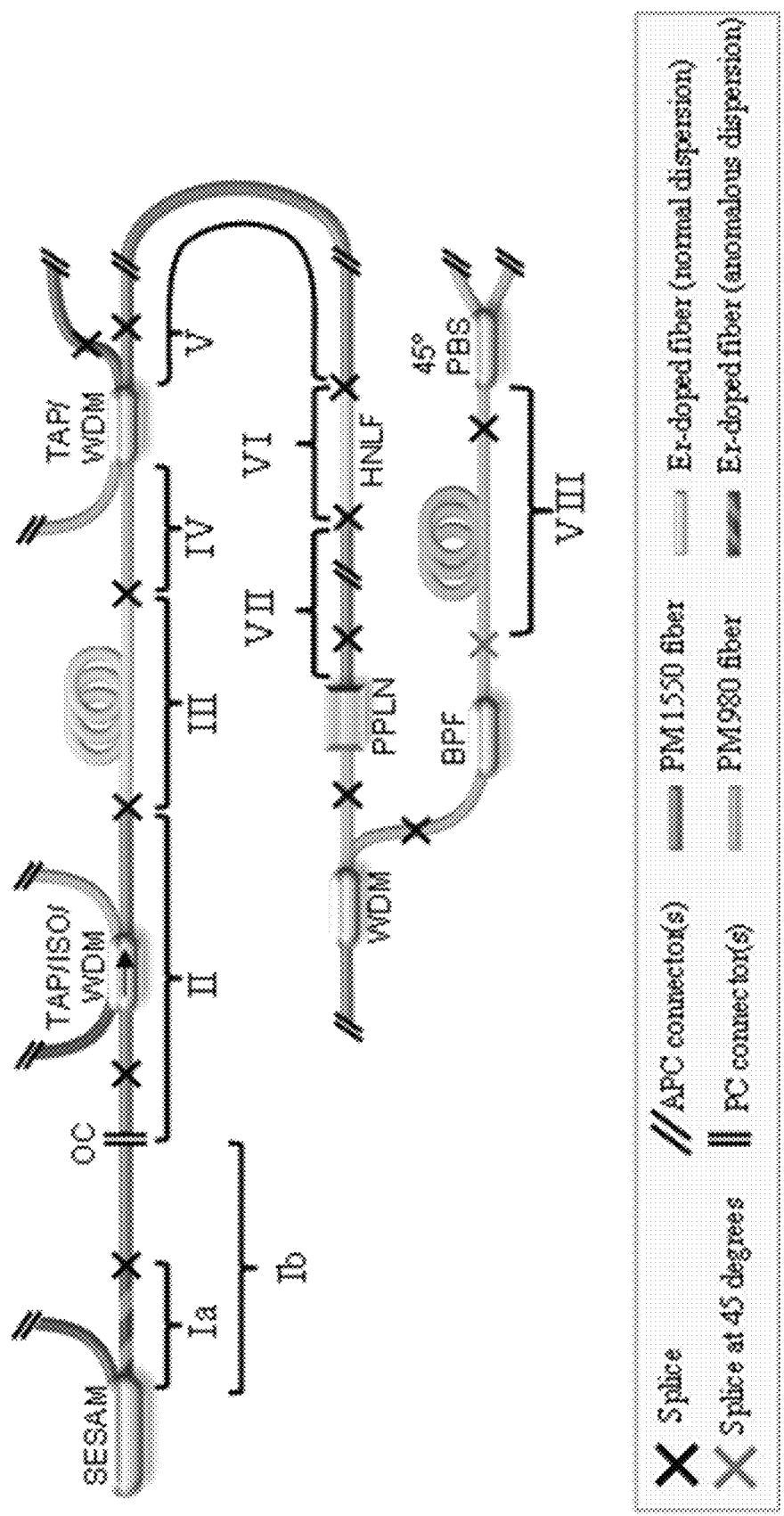
FIG. 17 shows a frequency comb article according to Example 1.

Three frequency comb articles (A, B, and C) were made and had sections shown in FIG. 17. The frequency comb articles included components listed in Table 1.

path length set during fabrication within a few parts in $10^5$ of a selected path length for operation at a selected temperature.

The path length was set by measuring a length of first oscillator fiber (in section Ia) and second oscillator fiber of the oscillator and co-aligning the first and second oscillator fibers in a fiber fusion splicer without splicing. To measure a round-trip oscillator delay time, light from a coherent optical frequency-domain reflectometer (OFDR) was coupled into the oscillator via an FC/PC connector. The OFDR signal returned a time delay or optical path length between reflections of a PC-connector interface at an output end of the oscillator and a SESAM first optical member on the other end.

The optical path length of the oscillator was determined. A length of fiber (first oscillator fiber or second oscillator fiber) was removed via cleaving, and the fibers were spliced together to form section Ib shown in FIG. 17. Cleaving and splicing can be an iterative process. Initially, the oscillator

TABLE 1

| Section of Frequency Comb | Material | Length in Article A (cm) | Length in Article B (cm) | Length in Article B (cm) |
|---|---|---|---|---|
| Ia | Gain medium: anomalous dispersion Er-doped fiber (Nufern PM-ESF-7/125) | 16.0 | 16.5 | 8.5 |
| Ib | Total fiber in oscillator | 50.0 | 50.0 | 50.0 |
| II | Between output coupler and amplifier (PM-1550) | 49 | 44 | 49 |
| III | Gain medium: normal dispersion Er-doped fiber (OFS EDF08-PM and nLight Er80-4/125-HD-PM) | 228.5* | 243.0** | 228.5 |
| IV | Compression between amplifier and HNLF (PM-980) | 42 | 42 | 42 |
| V | Compression between amplifier and HNLF (PM-1550) | 68.5 | 69.0 | 105.0 |
| VI | HNLF (2.3 ps/nm/km @1550 nm) | 24.5 | 27.5 | 27.0 |
| VII | PM-1550 between HNLF and PPLN | 52.0 | 48.5 | 43.5 |
| VIII | Delay length in in-line interferometer (PM-980)*** | 544.5 | 500.0 | 388.0 |

*includes 70 cm low gain Er-doped fiber and 158.5 cm high gain Er-doped fiber
**includes 80 cm low gain Er-doped fiber and 163 cm high gain Er-doped fiber
***fiber length ratio of VII to VIII can be, e.g., 1:10

The frequency comb articles had the following characteristics listed in Table 2.

was made too long to provide multiple cutbacks with OFDR measurements after each. Subsequently, the PC-connector at

TABLE 2

| Property | Frequency Comb Article A | Frequency Comb Article B | Frequency Comb Article C |
|---|---|---|---|
| Femtosecond Laser Center Wavelength (nm) | 1563.6 | 1558.8 | 1560.0 |
| 3 dB Femtosecond Laser Width (nm) | 12.2 | 11.5 | 12.6 |
| [Equivalent Pulse Width (fs)] | [210] | [222] | [202] |
| 3 dB Amplifier Width (nm) | 54 | 52 | 51 |
| 20% Amplifier Tap Output Power (mW) | ~70 | ~70 | ~70 |
| $f_{ceo}$ Integrated Phase Noise (rad) 10 MHz to 6 Hz | 2.0 | 3.6 | 2.6 |
| $f_{opt}$ Integrated Phase Noise (rad) 10 MHz to 6 Hz | 0.12 | 0.14 | 0.15 |
| Estimated Pulse-to-Pulse Timing Jitter (fs) | 1.6 | 2.9 | 2.1 |
| Projected Coherence Bandwidth (THz) | 200 | 110 | 150 |

Example 2

Oscillator Fabrication and Selection of Oscillator Repetition Rate

Frequency comb articles A, B, and C described in Example 1 include an all-fiber design that had an optical the end of the oscillator is polished, e.g., with diamond polishing paper, to remove excess oscillator fiber length. The repetition rate was measures by mating the newly polished end with the dielectric output coupler while the oscillator was pumped.

Figure 18A:
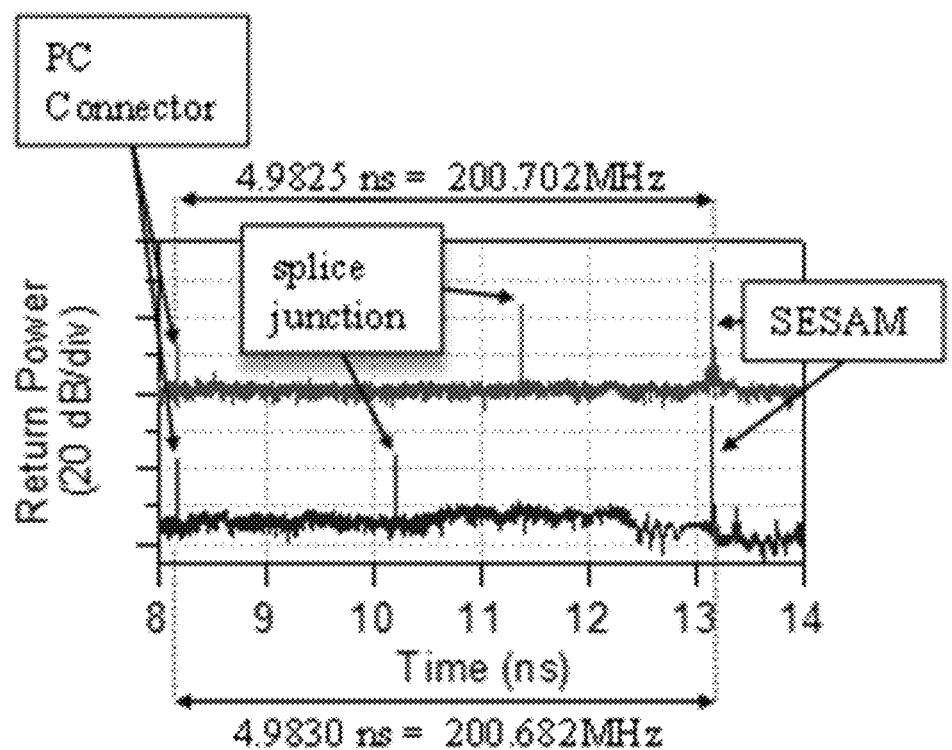
FIG. 18A shows a graph of return power versus time according to Example 2.
Figure 18B:
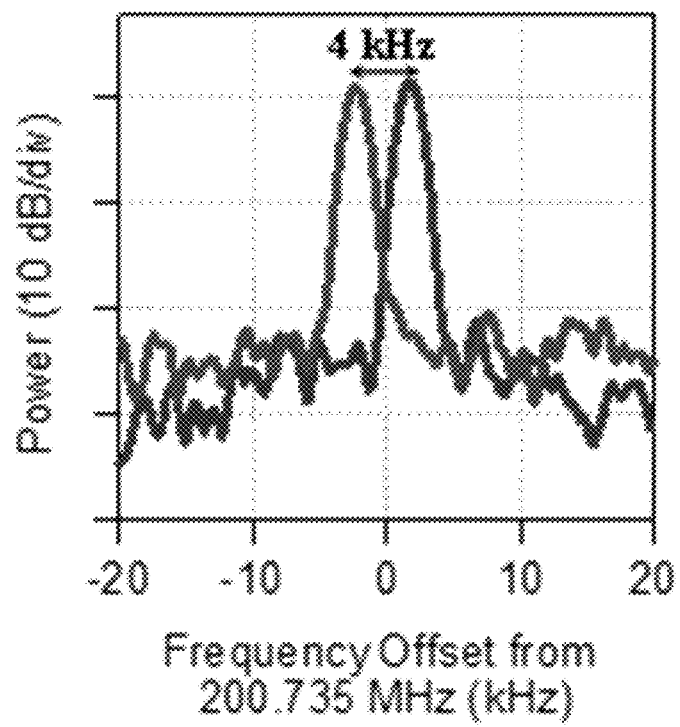
FIG. 18B shows a graph of power versus frequency offset according to Example 2.

Measurement results taken during path length determination are shown in FIG. 18A (graph of return power versus time) and FIG. 18B (graph of power versus frequency offset). FIG. 18A shows OFDR signals from two different femtosecond lasers. Each peak corresponded to a reflection in the oscillator with the time axis relative to a reference arm. Absorption due to the Er-doped fiber in the oscillator reduced a height of the SESAM peak. Curves were offset for clarity. FIG. 18B shows curves for a pair of oscillators (repetition rates differed by 4 kHz as indicated on the graph) after fine-tuning the repetition rate via polishing.

Example 3

Figure 19A:
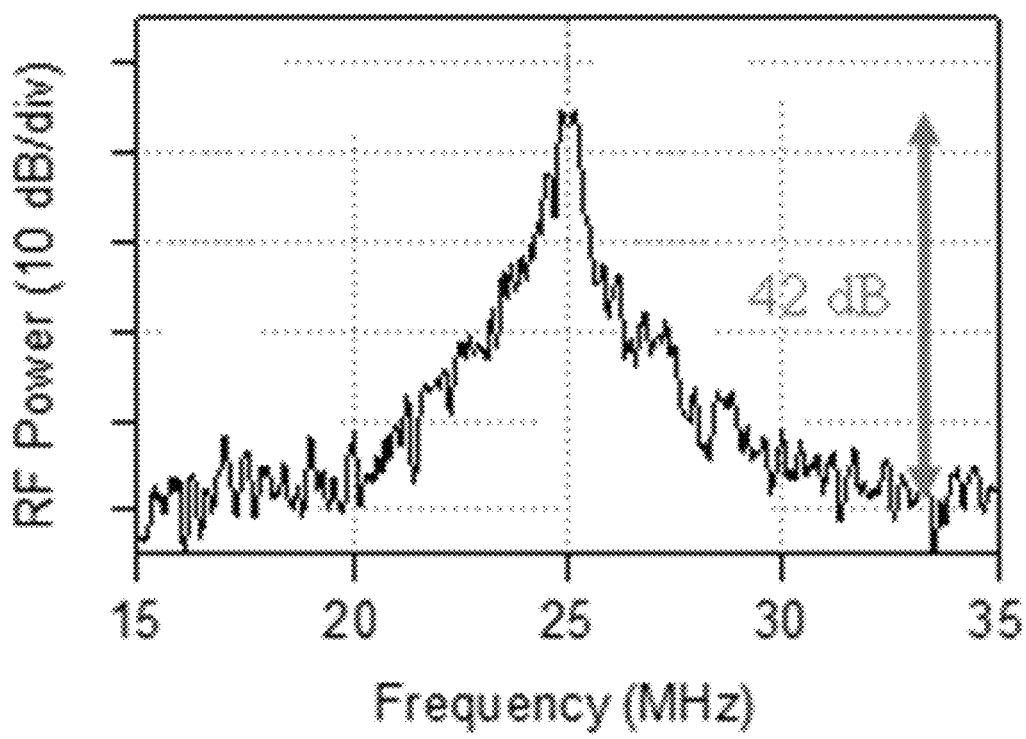
FIG. 19A shows a graph of RF power versus frequency according to Example 3.

Production of Carrier Envelope Offset Frequency $f_{ceo}$ and Heterodyne Frequency $f_{opt}$ Frequency comb article A described in Example 1 was used to produce carrier envelope offset frequency $f_{ceo}$ by a 1 f-to-2f referencing scheme. Here, the full octave-spanning spectrum was coupled to a fiber-coupled PPLN waveguide which frequency doubled the light at 2128 nm to 1064 nm. This waveguide has a built-in thermo-electric cooler to tune the PPLN temperature for optimized doubling at 2128 nm with a conversion efficiency of 5-10% including insertion losses and a bandwidth of 3 nm (corresponding to a pulse duration of 0.4 ps for the doubled light). The in-line fiber interferometer created by splicing the PM fiber output of the 1064-nm filter to a second PM fiber at a 45-degree rotation projected the fundamental and doubled light onto both fast and slow axes. After a delay length, chosen to optimize the $f_{ceo}$ SNR, the light from the slow and fast axes was recombined via a micro-optic polarizer oriented at 45 degrees. The ratio of fiber in the in-line interferometer to fiber between the HNLF and PPLN was 10:1. Two outputs from the micro-optic polarizer contained the temporally and spatially overlapped fundamental and doubled light that were directed to a balanced detector to produce carrier envelope offset frequency $f_{ceo}$ shown in FIG. 19A.

Figure 19B:
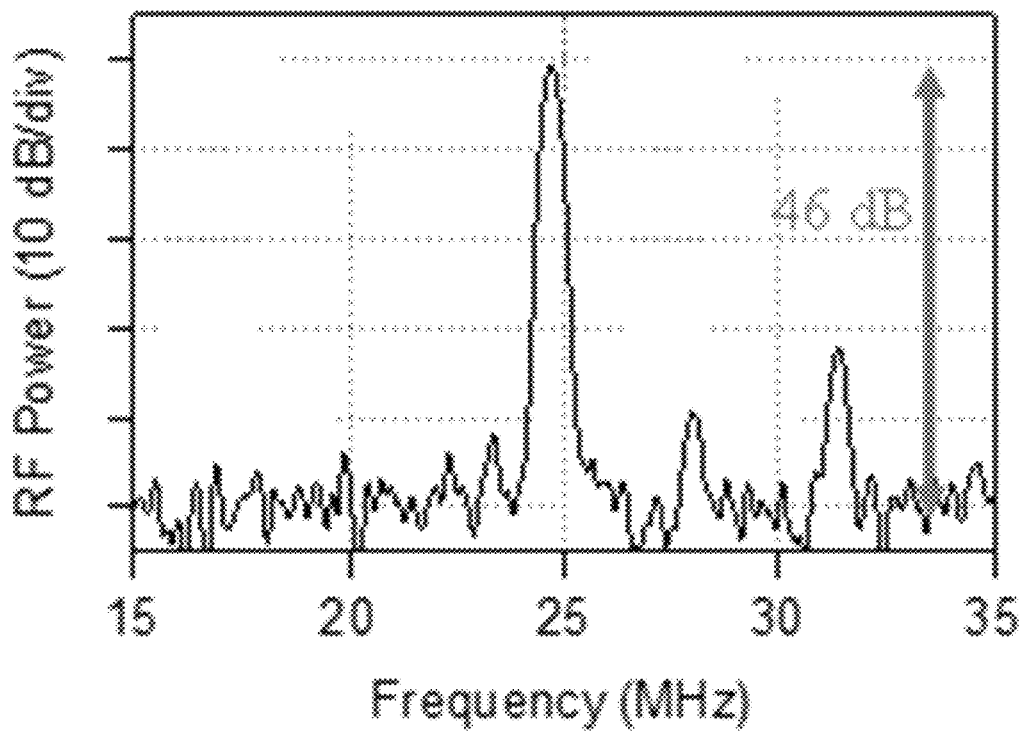
FIG. 19B shows a graph of RF power versus frequency according to Example 3.
Figure 20A:
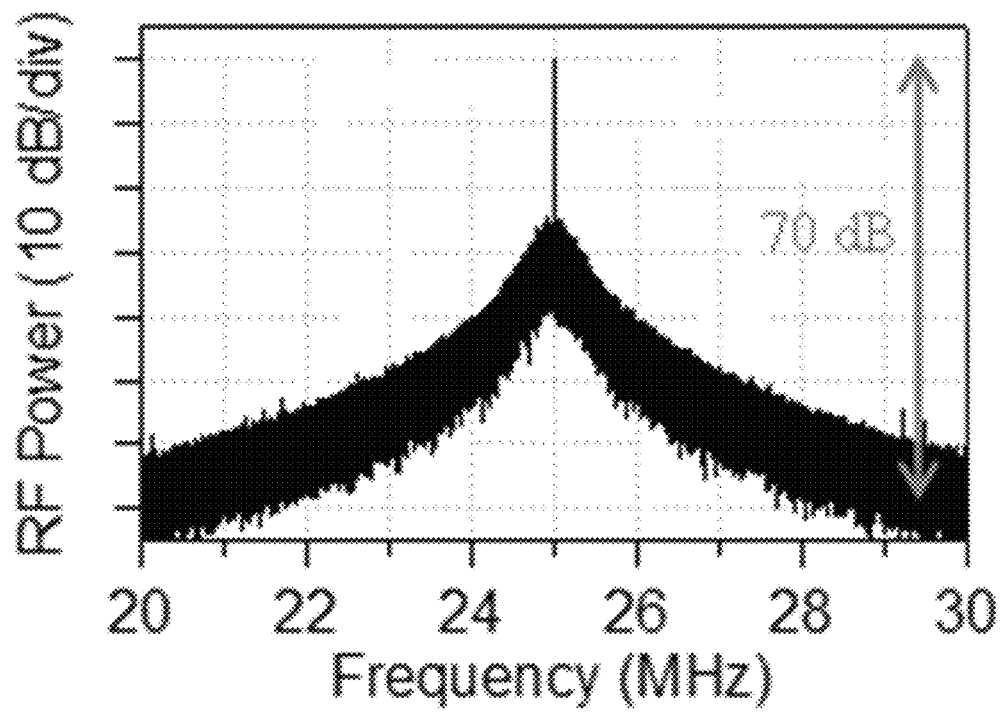
FIG. 20A shows a graph of RF power versus frequency according to Example 3.
Figure 20B:
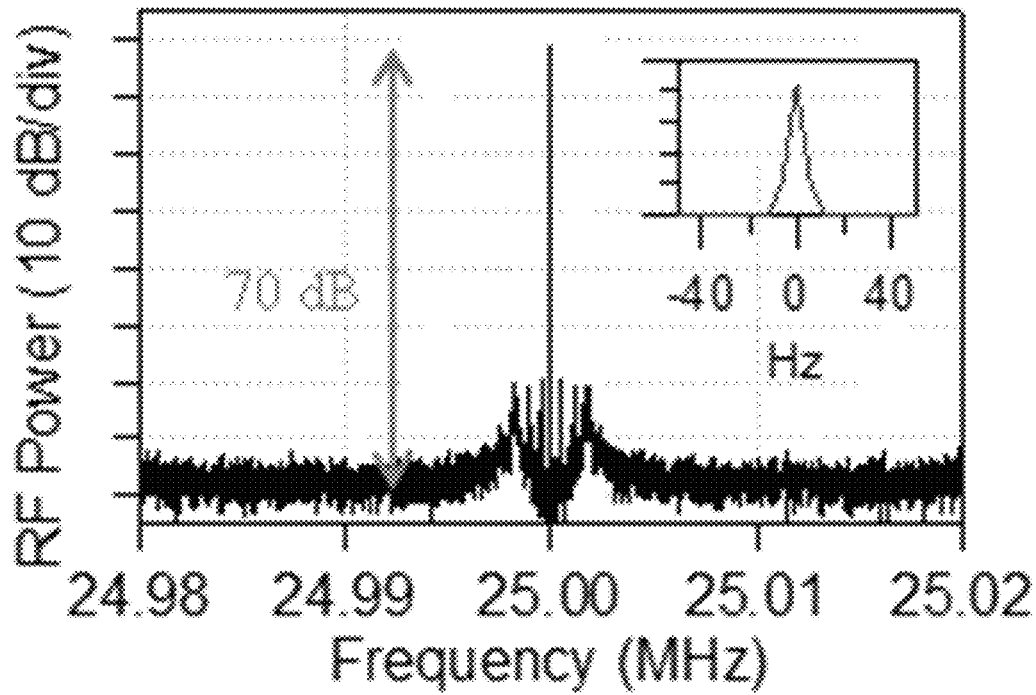
FIG. 20B shows a graph of RF power versus frequency according to Example 3.

To fully stabilize the frequency comb, the frequency of a single comb mode was stabilized via RF heterodyne measurement against a cavity-stabilized cw laser that produced 1535 nm or 1560 nm light. The frequency comb light from a 20% tap was combined with the laser light in a 50/50 PM fiber combiner, filtered by a 0.5 nm-wide wavelength division multiplexer, and detected to yield the RF signal shown in FIG. 19B. The heterodyne frequency $f_{opt}$ is the difference between the frequency of the cavity-stabilized cw laser and a nearest comb mode. Stabilized RF signals for carrier envelope offset frequency $f_{ceo}$ and heterodyne frequency $f_{opt}$ are shown in FIGS. 20A and 20B. Here, FIG. 20A shows data for a phase-locked carrier envelope offset frequency $f_{ceo}$ for frequency comb article A in a 6 Hz resolution bandwidth (RBW), and FIG. 20B shows data for a phase-locked heterodyne frequency $f_{opt}$ for frequency comb article A in a 6 Hz RBW. The inset shown in FIG. 20B shows that a linewidth is limited by the 0.3 s acquisition time.

Example 4

Phase Coherence

Figure 21A:
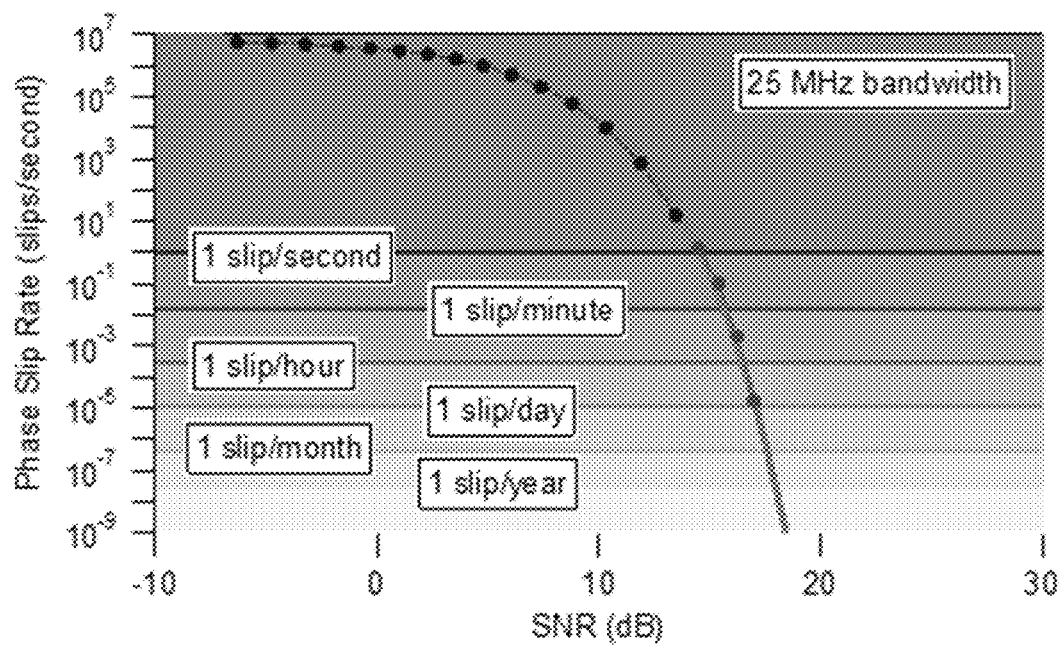
FIG. 21A shows a graph of phase slip rate versus SNR according to Example 4.
Figure 21B:
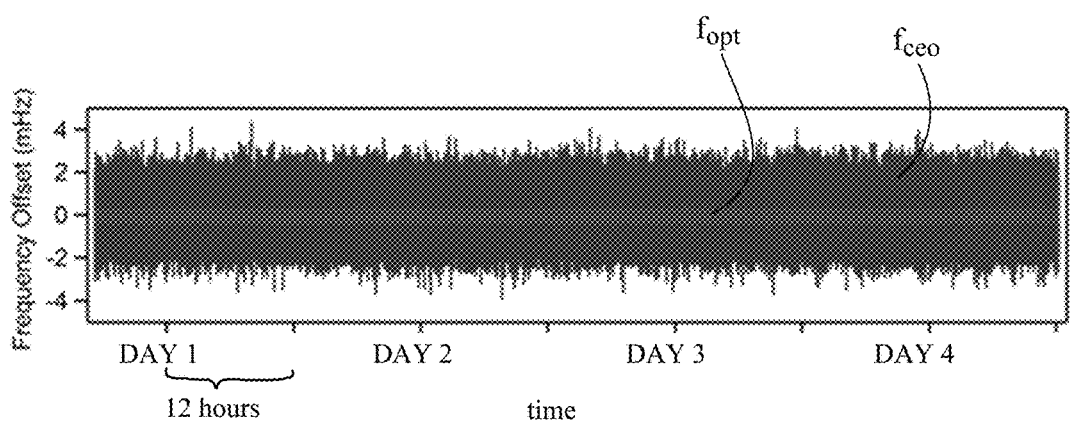
FIG. 21B shows a graph of frequency offset versus time according to Example 4.

To determine phase coherence of the frequency comb articles described in Example 1 and subjected to experimentation as described in Example 2 and Example 3, white electrical noise was applied to carrier envelope offset frequency $f_{ceo}$ before the digital-locking electronics received carrier envelope offset frequency $f_{ceo}$. The unmodified parent signal was monitored with a separate frequency counter to measure a phase-slip rate. A frequency jump on an independent frequency counter was recorded as a phase-slip when it exceeded a 1 Hz change from the mean frequency. In addition, a simulation of phase-slip rate was performed by adding Gaussian noise to a previously recorded high SNR carrier envelope offset frequency $f_{ceo}$. Both the results from the measurement and the simulation matched an expected curve for additive Gaussian noise as shown in FIG. 21A, which shows data for simulation of phase-slip rate versus SNR of the carrier envelope offset frequency $f_{ceo}$ in which Gaussian noise was added to the signal (dark-shaded points), an analytical calculation assuming Gaussian noise (solid curve), and the measurement for which electrical noise was added to the signal (light-shaded points). The raw carrier envelope offset frequency $f_{ceo}$ had a SNR of 35 dB in a 25 MHz bandwidth and had a negligible rate of phase-slips due to the SNR. FIG. 21B shows stability of locked frequency comb article A, which was operated fully-stabilized without phase-slips for 91 hours until the measurement was stopped. In FIG. 21B shows data for counted offset of carrier envelope offset frequency $f_{ceo}$ and heterodyne frequency $f_{opt}$ from their lock points with a 1 second gate time with a standard deviation of 0.9 mHz and 0.1 mHz, respectively, for frequency comb article B. No phase-slips were present over the complete 91 hours of measurement.

Example 5

Phase Noise and Timing Jitter

Figure 22A:
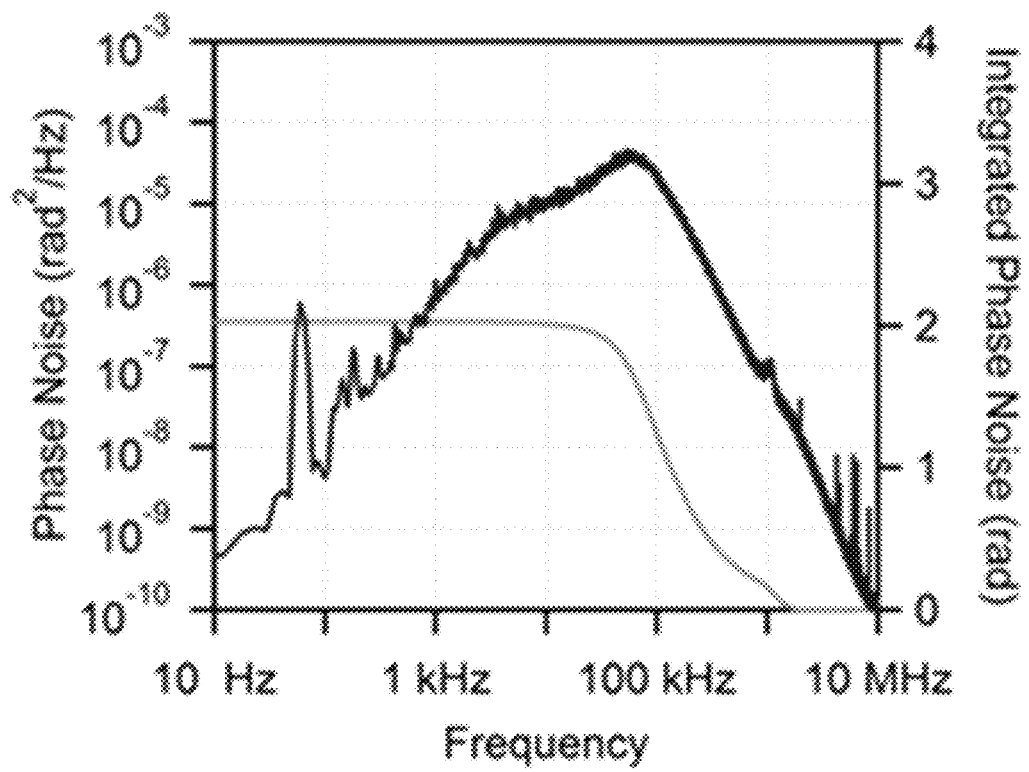
FIG. 22A shows a graph of phase noise versus frequency according to Example 5.
Figure 22B:
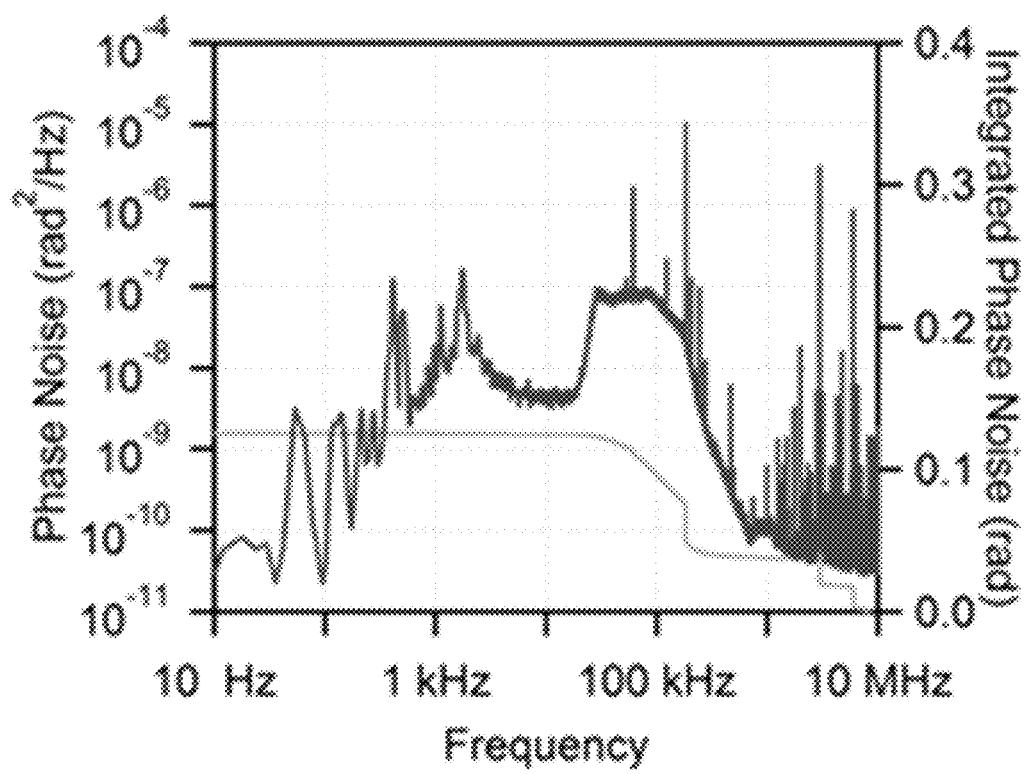
FIG. 22B shows a graph of phase noise versus frequency according to Example 5.

To determine phase noise and timing jitter of the frequency comb articles described in Example 1 and subjected to experimentation as described in Examples 2, 3, and 4, phase-noise spectra, shown in FIGS. 22A and 22B, provided a measure of performance of frequency comb articles A, B, C in which an integrated phase-noise for heterodyne frequency $f_{opt}$ was from 0.12 radians (rad) to 0.15 rad from 10 MHz to 6 Hz and for carrier envelope offset frequency $f_{ceo}$ was from 2.0 rad to 3.6 rad from 10 MHz to 6 Hz, with values extrapolated to Nyquist at 100 MHz from 0.16 rad to 0.23 rad and 2.0 rad to 3.6 rad, respectively. FIG. 22A shows data for carrier envelope offset frequency $f_{ceo}$ phase noise (left axis) and integrated phase noise (right axis) from 10 Hz to 10 MHz for frequency comb article A. FIG. 22B shows data for heterodyne frequency $f_{opt}$ phase noise (left axis) and integrated phase noise (right axis) from 10 Hz to 10 MHz for frequency comb article A.

The frequency comb articles were optically coherent around the optical lock point at 1535 nm. Here, the 2.0 rad to 3.6 rad phase noise on carrier envelope offset frequency $f_{ceo}$ corresponded to a projected coherence bandwidth across the comb spectrum from 300 THz to 150 THz such that an entire 200 THz-wide (1 µm-2 µm) comb output, centered at the optical lock point, was coherent.

A pulse-to-pulse timing jitter was calculated from the phase noise at the carrier envelope offset frequency $f_{ceo}$ and heterodyne frequency $f_{opt}$ lock points divided by an angular optical frequency separation and was for frequency comb article A, $\sqrt{2.0^2+0.16^2}/(2\pi\times195\text{ THz})=1.6$ fs, which assumed uncorrelated noise. For frequency comb article B, pulse-to-pulse timing jitter was 2.9 fs.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A frequency comb article comprising:
   an oscillator to produce an oscillator frequency comb comprising:
      a first power; and
      a first optical bandwidth;
   a fiber amplifier to receive the oscillator frequency comb from the oscillator and to produce an amplifier frequency comb based on the oscillator frequency comb, the amplifier frequency comb comprising:
      a second power that is greater than the first power; and
      a second optical bandwidth that is greater than the first optical bandwidth;
   an isolator interposed between the oscillator and the fiber amplifier to communicate the oscillator frequency comb to the fiber amplifier;
   a nonlinear fiber to receive the amplifier frequency comb from the fiber amplifier and to produce a spectrally broadened frequency comb based on the amplifier frequency comb, the spectrally broadened frequency comb comprising a third optical bandwidth that is greater than the second optical bandwidth;
   a frequency doubler to receive the spectrally broadened frequency comb from the nonlinear fiber and to provide a doubled frequency comb comprising:
      a plurality of fundamental frequencies from the spectrally broadened frequency comb; and
      a plurality of doubled frequencies, based on the plurality of fundamental frequencies
      the frequency doubler being interposed between a pair of wavelength division multiplexers;
   an interferometer in optical communication with the frequency doubler to receive the doubled frequency comb,
   wherein the fiber amplifier and the nonlinear fiber comprise a polarization maintaining fiber, and
   the oscillator and the frequency doubler are entirely polarization maintaining.

2. The frequency comb article of claim 1, wherein the oscillator comprises a fiber.

3. The frequency comb article of claim 2, wherein the fiber comprises an erbium-doped fiber.

4. The frequency comb article of claim 3, wherein a dispersion of the erbium-doped fiber is anomalous dispersion.

5. The frequency comb article of claim 4, wherein the oscillator further comprises a mirror that comprises a semiconductor saturable absorber.

6. The frequency comb article of claim 5, wherein the oscillator is configured to be self-mode locked.

7. The frequency comb article of claim 6, wherein the frequency comb article is configured such that, when operated, the oscillator frequency comb is stabilized to the amplifier frequency comb.

8. The frequency comb article of claim 7, wherein the oscillator further comprises a piezo-electric transducer disposed on the fiber.

9. The frequency comb article of claim 7, wherein the oscillator is referenced to the signal frequency comb from the interferometer.

10. The frequency comb article of claim 1, wherein the fiber amplifier comprises a normal dispersion fiber.

11. The frequency comb article of claim 10, wherein the normal dispersion fiber comprises an erbium-doped fiber.

12. The frequency comb article of claim 1, wherein the frequency doubler comprises a waveguide, and the waveguide comprises a periodically poled lithium niobate crystal.

13. The frequency comb article of claim 1, wherein the interferometer receives the doubled frequency comb from frequency doubler and provides a signal frequency comb based on the doubled frequency comb, the signal frequency comb comprising the plurality of doubled frequencies that is temporally overlapped and spatially overlapped with the plurality of fundamental frequencies,
   wherein the interferometer is entirely polarization maintaining.

14. The frequency comb article of claim 1, further comprising a housing in which the oscillator, the fiber amplifier, the nonlinear fiber, and the frequency doubler are disposed.

15. The frequency comb article of claim 1, wherein a dispersion of the oscillator is less than or equal to -0.04 ps$^2$, based on a round-trip propagation of light in the oscillator.

16. The frequency comb article of claim 1, wherein the spectrally broadened frequency comb comprises an optical coherence that is less than 2 radians for an entire bandwidth of the spectrally broadened frequency comb.

17. The frequency comb article of claim 1, wherein the frequency comb article is configured to produce the spectrally broadened frequency comb that is coherent for greater than 90 hours.

18. The frequency comb article of claim 1, wherein the oscillator, the fiber amplifier, the nonlinear fiber, and the frequency doubler comprise a plurality of polarization maintaining fibers in an absence of free-space propagation of radiation in the frequency comb article.

19. The frequency comb article of claim 1, wherein the spectrally broadened frequency comb comprises:
- an octave-spanning spectrum from 1 μm to greater than 2.5 μm; and
- a pulse-to-pulse timing jitter that is less than or equal to 3 fs.

20. The frequency comb article of claim 1, wherein the frequency comb article is configured to maintain:
- an optical coherence of the spectrally broadened frequency comb when subjected to an acceleration greater than or equal to 0.5 g (4.9 m/s$^2$), and
- a pulse-to-pulse timing jitter of the spectrally broadened frequency comb when subjected to an acceleration greater than or equal to 0.5 g (4.9 m/s$^2$).

* * * * *